(12) United States Patent
Cebulski et al.

(10) Patent No.: US 11,861,880 B2
(45) Date of Patent: Jan. 2, 2024

(54) SYSTEM AND METHOD FOR PROPERTY TYPICALITY DETERMINATION

(71) Applicant: Cape Analytics, Inc., Mountain View, CA (US)

(72) Inventors: Sarah Cebulski, Mountain View, CA (US); Kyler J. Brown, Mountain View, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 0 days.

(21) Appl. No.: 17/968,662

(22) Filed: Oct. 18, 2022

(65) Prior Publication Data

US 2023/0119132 A1 Apr. 20, 2023

Related U.S. Application Data

(60) Provisional application No. 63/257,427, filed on Oct. 19, 2021.

(51) Int. Cl.
*G06V 10/77* (2022.01)
*G06V 10/764* (2022.01)
*G06V 10/74* (2022.01)

(52) U.S. Cl.
CPC ........ *G06V 10/7715* (2022.01); *G06V 10/761* (2022.01); *G06V 10/764* (2022.01)

(58) Field of Classification Search
CPC .................................................... G06V 20/176
See application file for complete search history.

(56) References Cited

U.S. PATENT DOCUMENTS

| | | | |
|---|---|---|---|
| 9,911,042 B1 | 3/2018 | Cardona et al. | |
| 2013/0054476 A1 | 2/2013 | Whelan | |
| 2015/0088886 A1 | 3/2015 | Brouwer et al. | |
| 2016/0292800 A1* | 10/2016 | Smith | G06Q 50/16 |
| 2019/0294647 A1 | 9/2019 | Brouwer et al. | |
| 2019/0304026 A1* | 10/2019 | Lyman | G06F 18/217 |
| 2020/0160030 A1 | 5/2020 | Lavi | |
| 2021/0182529 A1 | 6/2021 | Singh et al. | |

OTHER PUBLICATIONS

"Geospatial Property Analytics: Supercharging AVMs for SFR Investing", Cape Analytics, downloaded Oct. 3, 2022, https://capeanalytics.com/blog/geospatial-property-analytics-avm-sfr-investing/.

"ValPro+—Cape Analytics", Cape Analytics, https://web.archive.org/web/20210301122341/https://capeanalytics.com/valpro/, downloaded Oct. 3, 2022.

"Weiss Analytics Launches ValPro+, First AVM Powered by Cape Analytics' Instant Property Condition Assessments", Cape Analytics, Feb. 19, 2021, https://capeanalytics.com/resources/weiss-analytics-valpro-instant-property-condition-assessments/.

* cited by examiner

*Primary Examiner* — Ross Varndell
(74) *Attorney, Agent, or Firm* — Jeffrey Schox; Diana Lin

(57) ABSTRACT

The method for property typicality determination can include: determining a property, determining attribute values for the property, determining a reference population for the property, determining reference population attribute values, determining a typicality metric for the property, and optionally determining an influential attribute.

16 Claims, 12 Drawing Sheets

SYSTEM AND METHOD FOR PROPERTY TYPICALITY DETERMINATION

CROSS-REFERENCE TO RELATED APPLICATIONS

This application claims the benefit of U.S. Provisional Application No. 63/257,427 filed 19 Oct. 2021, which is incorporated in its entirety by this reference.

TECHNICAL FIELD

This invention relates generally to the property analysis field, and more specifically to a new and useful system and method in the property analysis field.

DETAILED DESCRIPTION

The following description of the embodiments of the invention is not intended to limit the invention to these embodiments, but rather to enable any person skilled in the art to make and use this invention.

1. Overview

Figure 1:
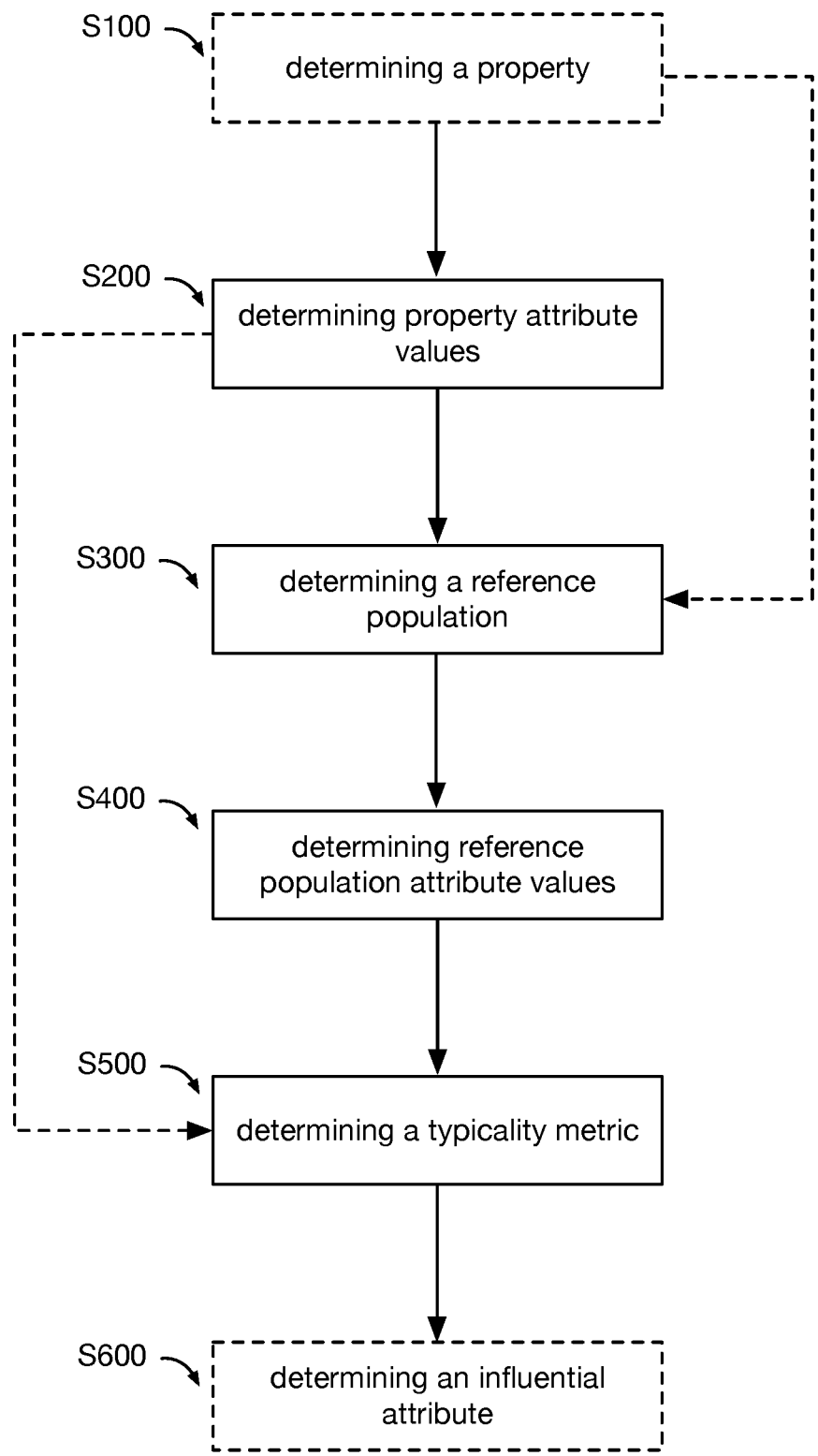
FIG. 1 is a schematic representation of a first variant of the method.

As shown in FIG. 1, the method can include: determining a property S100, determining attribute values for the property S200, determining a reference population for the property S300, determining reference population attribute values S400, determining a typicality metric for the property S500, and/or any suitable steps. The method can optionally include determining an influential attribute S600.

In variants, the method can function to determine how typical and/or atypical a property is in comparison to properties in a reference population.

2. Examples

In an example, the method includes: identifying a property (e.g., property of interest); determining a reference population (e.g., a set of reference properties) for the property satisfying a set of criteria (e.g., a location associated with the property, a default reference population for the property identifier, received as part of a user request, etc.); determining attribute values (e.g., for each of a set of attributes) for the property and the reference population (e.g., for each reference property); and calculating the typicality metric based on the property attribute values and the reference population attribute values. The attribute values can be: retrieved from a database (e.g., pre-calculated and stored in the database), retrieved from third-party databases, extracted from measurements (e.g., extracted responsive to a request), and/or otherwise determined. The property can be: identified via a property identifier input request, selected from a database, selected from a set of properties (e.g., wherein the method is iteratively performed for each of the set of properties, wherein the remainder of the set of properties is the reference population), and/or otherwise determined. The typicality metric can be calculated (e.g., using a typicality model) as a comparison between a vector of attribute values for the property and one or more vectors of attribute values for the reference population (e.g., an attribute vector for each reference property, an aggregate attribute vector of averaged attribute values, etc.). The comparison can optionally be based on a distribution metric (e.g., variance, covariance, statistical measure, etc.) associated with the reference population attribute values.

In a second example, the method can include: directly predicting the typicality metric based on property information, such as measurements (e.g., images), for the property and for the reference population using a trained typicality model (e.g., processing measurements directly as inputs to the typicality model).

However, the method can be otherwise performed.

3. Technical Advantages

Variants of the technology can confer one or more advantages over conventional technologies.

Conventional methods of determining how similar a property is relative to a reference population are subjective, inefficient, and prone to significant error. Variants of the technology can be more objective, more accurate, faster, more efficient, and/or more scalable than conventional methods.

First, variants of the technology can provide increased objectivity and/or decreased subjective influence on the typicality metric. For example, in addition to using standard property records and assessor data, the technology can leverage objective computer vision/machine learning (CV/ML) derived content (e.g., attribute values), instead of relying on human-reported content that is subjective and vulnerable to bias. In a specific example, a typicality metric for a given property can be determined by comparing attribute values extracted from images of the given property to attribute values extracted from images of the reference population (e.g., images of each reference property in the reference population).

Second, variants of the technology can provide a more accurate measure (e.g., quantitative measure) of property typicality. In a first example, a typicality model can be trained to predict a typicality metric that is correlated with a validation metric (e.g., automated valuation model error, historical valuation, manual labeling, price discrepancy, days on market, insurance loss ratio, etc.), wherein the typicality model can predict the typicality metric for a property, even when the validation information is unavailable for that property. In a specific example, the inventors have discovered that there is a statistically significant correlation between the typicality metric and automated valuation model (AVM) error such that the typicality metric can be used to determine the relative risk in the valuation of a given property. In a second example, a subset of attributes (e.g., high-impact attributes, causal attributes, etc.) can be selected for use in the typicality model, which can reduce the number of overall attributes that are analyzed, thereby resulting in a faster, potentially more accurate typicality prediction.

Third, variants of the method can determine the causality for a property's atypicality. In an example, the method can identify property attribute values that have the most significant impact on the property typicality metric, and optionally provide a semantic representation of how the attribute impacted the typicality metric (e.g., based on the attribute's value). This can enable lenders, real estate agents, and/or insurance agents, property owners, and/or other entities to better understand how to approach the property (e.g., adjust valuation, adjust portfolio, guide improvements, etc.).

Fourth, variants of the technology can improve the functioning of other technologies. For example, the typicality metric can be used as an input to downstream models (e.g., an AVM model, risk prediction model, insurance model, rental estimate model, vacancy prediction model, etc.) to reduce error and increase the accuracy of the downstream model's output (e.g., adjusting the model to account for atypicality, etc.). In another example, the typicality metric can be associated with a model output adjustment, wherein the model's output can be adjusted by the model output adjustment to account for the property's typicality and/or atypicality. In another example, the typicality metrics of a pre- and post-proposed property change (e.g., remodel) can be compared to evaluate the effects of the proposed property change.

Fifth, variants of the technology can increase computational efficiency and/or decrease computational resources by selecting and/or adjusting a downstream model (e.g., an AVM model) based on the typicality metric determined for a given property. For example, a nonstandard AVM model can be used for atypical properties, an AVM model can be adjusted for atypical properties (e.g., fork the model, apply parameter adjustments in the model and/or to model outputs, etc.), and/or any other AVM model adjustment can be used. This can provide computational savings by reducing the complexity of an AVM model (e.g., using multiple, less complex AVM models to achieve the same or increased accuracy compared to a single, more complex AVM model) and/or by identifying which homes need less or more computationally intensive models.

However, further advantages can be provided by the system and method disclosed herein.

4. System

Figure 3:
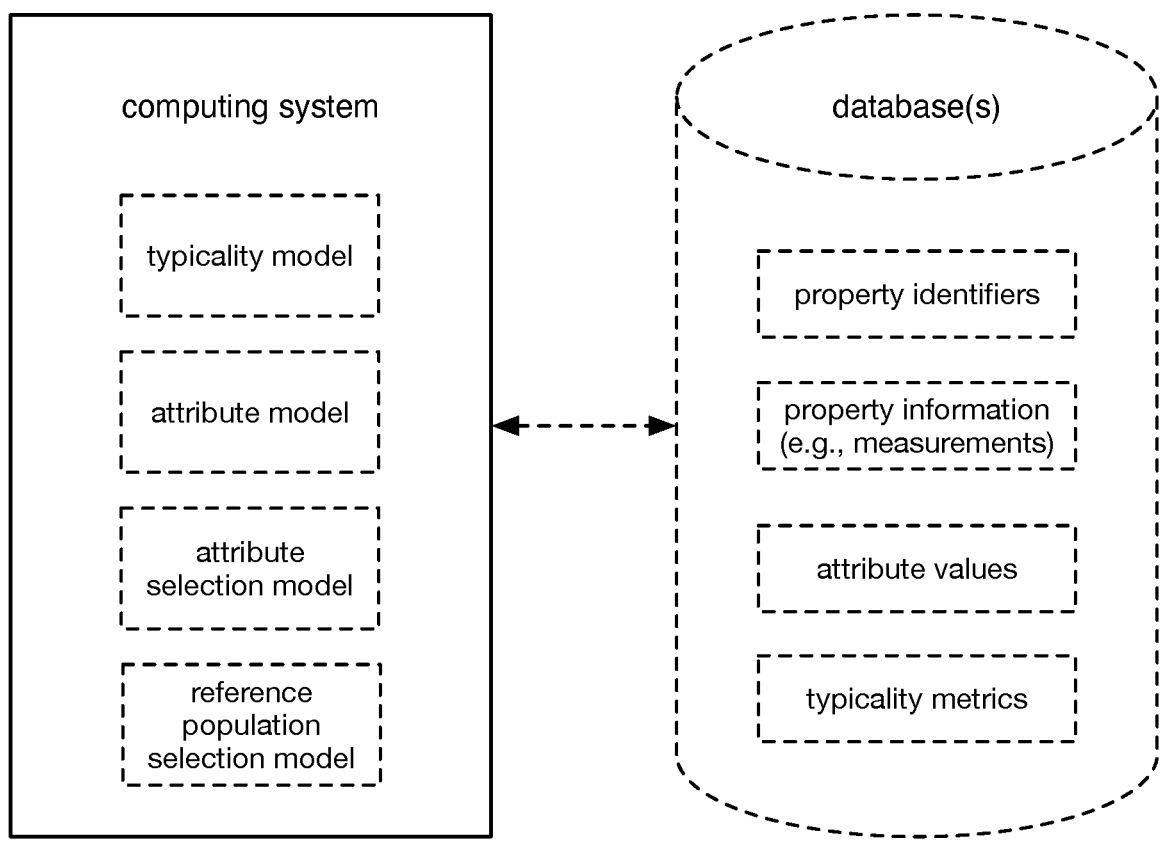
FIG. 3 is a schematic representation of a variant of the system.

As shown in FIG. 3, the system can include one or more typicality models, attribute models, and/or any other set of models. The system can optionally include a computing system, a database, and/or any other suitable components. In variants, the system can function to determine one or more typicality metrics for a property based on measurements associated with the property (e.g., depicting the property).

The system can be used with one or more properties. The properties can function as test properties (e.g., properties of interest), training properties (e.g., used to train the model(s)), and/or be otherwise used.

Each property can be or include: a parcel (e.g., land), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). Property components can include: built structures (e.g., primary structure, accessory structure, deck, pool, etc.); subcomponents of the built structures (e.g., roof, siding, framing, flooring, living space, bedrooms, bathrooms, garages, foundation, HVAC systems, solar panels, slides, diving board, etc.); permanent improvements (e.g., pavement, statutes, fences, etc.); temporary improvements or objects (e.g., trampoline); vegetation (e.g., tree, flammable vegetation, lawn, etc.); land subregions (e.g., driveway, sidewalk, lawn, backyard, front yard, wildland, etc.); debris; and/or any other suitable component. The property and/or components thereof are preferably physical, but can alternatively be virtual.

Each property can be identified by one or more property identifiers. A property identifier (property ID) can include: geographic coordinates, an address, a parcel identifier, a block/lot identifier, a planning application identifier, a municipal identifier (e.g., determined based on the ZIP, ZIP+4, city, state, etc.), and/or any other identifier. The property identifier can be used to retrieve property information, such as parcel information (e.g., parcel boundary, parcel location, parcel area, etc.), property measurements, property descriptions, and/or other property data. The property identifier can additionally or alternatively be used to identify a property component, such as a primary building or secondary building, and/or be otherwise used.

Each property can be associated with property information. The property information can be static (e.g., remain constant over a threshold period of time) or variable (e.g., vary over time). The property information can be associated with: a time (e.g., a generation time, a valid duration, etc.), a source (e.g., the information source), an accuracy or error, and/or any other suitable metadata. The property information is preferably specific to the property, but can additionally or alternatively be from other properties (e.g., neighboring properties, other properties sharing one or more attributes with the property). Examples of property information can include: measurements, descriptions, attributes, auxiliary data, and/or any other suitable information about the property.

Property measurements preferably measure an aspect about the property, such as a visual appearance, geometry, and/or other aspect. In variants, the property measurements can depict a property (e.g., the property of interest), but can additionally or alternatively depict the surrounding geographic region, adjacent properties, and/or other factors. The measurement can be: 2D, 3D, and/or have any other set of dimensions. Examples of measurements can include: images, surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, virtual models (e.g., geometric models, mesh models), audio, video, radar measurements, ultrasound measurements, and/or any other suitable measurement. Examples of images that can be used include: RGB images, hyperspectral images, multispectral images, black and white images, grayscale images, panchromatic images, IR images, NIR images, UV images, thermal images, and/or images sampled using any other set of wavelengths; images with depth values associated with one or more pixels (e.g., DSM, DEM, etc.); and/or other images.

The measurements can include: remote measurements (e.g., aerial imagery, such as satellite imagery, balloon imagery, drone imagery, etc.), local or on-site measurements (e.g., sampled by a user, streetside measurements, etc.), and/or sampled at any other proximity to the property. The remote measurements can be measurements sampled more than a threshold distance away from the property, such as more than 100 ft, 500 ft, 1,000 ft, any range therein, and/or sampled any other distance away from the property. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the property. The measurements can depict the property exterior, the property interior, and/or any other view of the property.

The measurements can be a full-frame measurement, a segment of the measurement (e.g., the segment depicting the property, such as that depicting the property's parcel; the segment depicting a geographic region a predetermined distance away from the property; etc.), a merged measurement (e.g., a mosaic of multiple measurements), orthorectified, and/or otherwise processed.

The measurements can be received as part of a user request, retrieved from a database, determined using other data (e.g., segmented from an image, generated from a set of images, etc.), synthetically determined, and/or otherwise determined.

The property information can include property descriptions. The property description can be: a written description (e.g., a text description), an audio description, and/or in any other suitable format. The property description is preferably verbal but can alternatively be nonverbal. Examples of property descriptions can include: listing descriptions (e.g., from a realtor, listing agent, etc.), property disclosures, inspection reports, permit data, appraisal reports, and/or any other text based description of a property.

The property information can include auxiliary data. Examples of auxiliary data can include property descriptions, permit data, insurance loss data, inspection data, appraisal data, broker price opinion data, property valuations, property attribute and/or component data (e.g., values), and/or any other suitable data. The auxiliary data can be used to: determine attribute values, increase the accuracy of the typicality metric, select which attributes should be used for typicality metric determination, and/or otherwise used.

However, the property information can include any other suitable information about the property.

All or a subset of properties can be associated with attribute values for one or more property attributes, wherein the attribute values function to represent one or more quantitative, qualitative, semantic, and/or other aspects of the property.

Each property can be associated with a set of property attributes, which function to represent one or more aspects of a given property. The property attributes can be semantic, quantitative, qualitative, and/or otherwise describe the property. Each property can be associated with its own set of property attributes, and/or share property attributes with other properties. As used herein, property attributes can refer to the attribute parameter (e.g., the variable) and/or the attribute value (e.g., value bound to the variable for the property).

Property attributes can include: property components, features (e.g., feature vector, mesh, mask, point cloud, pixels, voxels, any other parameter extracted from a measurement), any parameter associated with a property component (e.g., property component characteristics), semantic features (e.g., whether a semantic concept appears within the property information), and/or higher-level summary data extracted from property components and/or features. Property attributes can be determined based on property information for the property itself, neighboring properties, and/or any other set of properties. Property attributes can be automatically determined, manually determined, and/or otherwise determined.

Property attributes can be intrinsic, extrinsic, and/or otherwise related to the property. Intrinsic attributes are preferably inherent to the property's physical aspects, and would have the same values for the property independent of the property's context (e.g., property location, market conditions, etc.), but can be otherwise defined. Examples of intrinsic attributes include: record attributes, structural attributes, condition attributes, and/or other attributes determined from measurements or descriptions about the property itself. Extrinsic attributes can be determined based on other properties or factors (e.g., outside of the property). Examples of extrinsic attributes include: attributes associated with property location, attributes associated with neighboring properties (e.g., proximity to a given property component of a neighboring property), and/or other extrinsic attributes. Examples of attributes associated with the property location can include distance and/or orientation relative to a: highway, coastline, lake, railway track, river, wildland and/or any large fuel load, hazard potential (e.g., for wildfire, wind, fire, hail, flooding, etc.), other desirable site (e.g., park, beach, landmark, etc.), other undesirable site (e.g., cemetery, landfill, wind farm, etc.), zoning information (e.g., residential, commercial, and industrial zones; subzoning; etc.), and/or any other attribute associated with the property location.

Property attributes can include: structural attributes, condition attributes, record attributes, semantic attributes, subjective attributes, and/or any other suitable set of attributes.

Structural attributes can include: structure class/type, parcel area, framing parameters (e.g., material), flooring (e.g., floor type), historical construction information (e.g., year built, year updated/improved/expanded, etc.), area of living space, the presence or absence of a built structure (e.g., deck, pool, ADU, garage, etc.), physical or geometric attributes of the built structure (e.g., structure footprint, roof surface area, number of roof facets, roof slope, pool surface area, building height, number of beds, number of baths, number of stories, etc.), relationships between built structures (e.g., distance between built structures, built structure density, setback distance, count, etc.), presence or absence of an improvement (e.g., solar panel, etc.), ratios or comparisons therebetween, and/or any other structural descriptors.

Condition-related attributes can include: roof condition (e.g., tarp presence, material degradation, rust, missing or peeling material, sealing, natural and/or unnatural discoloration, defects, loose organic matter, ponding, patching, streaking, etc.), wall condition, exterior condition, accessory structure condition, yard debris and/or lot debris (e.g., presence, coverage, ratio of coverage, etc.), lawn condition, pool condition, driveway condition, tree parameters (e.g., overhang information, height, etc.), vegetation parameters (e.g., coverage, density, setback, location within one or more zones relative to the property), presence of vent coverings (e.g., ember-proof vent coverings), structure condition, occlusion (e.g., pool occlusion, roof occlusion, etc.), pavement condition (e.g., percent of paved area that is deteriorated), resource usage (e.g., energy usage, gas usage, etc.), overall property condition, and/or other parameters (e.g., that are variable and/or controllable by a resident). Condition-related attributes can be a rating for a single structure, a minimum rating across multiple structures, a weighted rating across multiple structures, and/or any other individual or aggregate value.

Record attributes can include: number of beds/baths, construction year, square footage, legal class (e.g., residential, mixed-use, commercial, etc.), legal subclass (e.g., single-family vs. multi-family, apartment vs. condominium, etc.), location (e.g., neighborhood, zip code, etc.), location factors (e.g., positive location factors such as distance to a park, distance to school; negative location factors such as distance to sewage treatment plans, distance to industrial zones; etc.), population class (e.g., suburban, urban, rural, etc.), school district, orientation (e.g., side of street, cardinal direction, etc.) and/or any other suitable attributes (e.g., that can be extracted from a property record or listing).

Semantic attributes (e.g., semantic features) can include whether a semantic concept is associated with the property (e.g., whether the semantic concept appears within the property information). Examples of semantic attributes can include: whether a property is in good condition (e.g., "turn key", "move-in ready", or related terms appear in the description), "poor condition", "walkable", "popular", small (e.g., "cozy" appears in the description), and/or any other suitable semantic concept. The semantic attributes can be extracted from: the property descriptions, the property measurements, and/or any other suitable property information. The semantic attributes can be extracted using a model (e.g., an NLP model, a CNN, a DNN, etc.) trained to identify keywords, trained to classify or detect whether a semantic concept appears within the property information, and/or otherwise trained.

Subjective attributes can include: curb appeal, viewshed, and/or any other suitable attributes. Other property attributes can include: built structure values (e.g., roof slope, roof rating, roof material, root footprint, covering material, etc.), auxiliary structures (e.g., a pool, a statue, ADU, etc.), risk asset scores (e.g., asset score indicating risk of flooding, hail, wildfire, wind, house fire, etc.), neighboring property values (e.g., distance of neighbor, structure density, structure count, etc.), and/or any other suitable attributes.

Example property attributes can include: structural attributes (e.g., for a primary structure, accessory structure, neighboring structure, etc.), record attributes (e.g., number of bed/bath, construction year, square footage, legal class, legal subclass, geographic location, etc.), condition attributes (e.g., yard condition, roof condition, pool condition, paved surface condition, etc.), semantic attributes (e.g., semantic descriptors), location (e.g., parcel centroid, structure centroid, roof centroid, etc.), property type (e.g., single family, lease, vacant land, multifamily, duplex, etc.), property component parameters (e.g., area, enclosure, presence, structure type, count, material, construction type, area condition, spacing, relative and/or global location, distance to another component or other reference point, density, geometric parameters, condition, complexity, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, paved surface condition, etc.), foundation elevation, terrain parameters (e.g., parcel slope, surrounding terrain information, etc.), legal class (e.g., residential, mixed-use, commercial), legal subclass (e.g., single-family vs. multi-family, apartment vs. condominium), geographic location (e.g., neighborhood, zip, etc.), population class (e.g., suburban, urban, rural, etc.), school district, orientation (e.g., side of street, cardinal direction, etc.), subjective attributes (e.g., curb appeal, viewshed, etc.), built structure values (e.g., roof slope, roof rating, roof material, roof footprint, covering material, etc.), auxiliary structures (e.g., a pool, a statue, ADU, etc.), risk scores (e.g., score indicating risk of flooding, hail, fire, wind, wildfire, etc.), neighboring property values (e.g., distance to neighbor, structure density, structure count, etc.), context (e.g., hazard context, geographic context, vegetation context, weather context, terrain context, etc.), historical construction information, historical transaction information (e.g., list price, sale price, spread, transaction frequency, transaction trends, etc.), semantic information, and/or any other attribute that remains substantially static after built structure construction. In a specific example, the attributes can exclude condition-related attributes.

In variants, the set of attributes that are used (e.g., by the model(s)) can be selected from a superset of candidate attributes. This can function to: reduce computational time and/or load (e.g., by reducing the number of attributes that need to be extracted and/or processed), increase score prediction accuracy (e.g., by reducing or eliminating confounding attributes), and/or be otherwise used. The set of attributes can be selected: manually, automatically, randomly, recursively, using an attribute selection model, using lift analysis (e.g., based on an attribute's lift), using any explainability and/or interpretability method, based on an attribute's correlation with a given metric or training label, using predictor variable analysis, through predicted outcome validation, during model training (e.g., attributes with weights above a threshold value are selected), using a deep learning model, based on a zone classification, and/or via any other selection method or combination of methods.

The attributes can be determined from property information (e.g., property measurements, property descriptions, etc.), a database or a third party source (e.g., third-party database, MLS™ database, city permitting database, historical weather and/or hazard database, tax assessor database, etc.), be predetermined, be calculated (e.g., from an extracted value and a scaling factor, etc.), and/or be otherwise determined. In a first example, the attributes can be determined by extracting features from property measurements, wherein the attribute values can be determined based on the extracted feature values. In a second example, a trained attribute model can predict the attribute value directly from property information (e.g., based on property imagery, descriptions, etc.). In a third example, the attributes can be determined by extracting features from a property description (e.g., using a sentiment extractor, keyword extractor, etc.). However, the attributes can be otherwise determined. In examples, the attribute values can be determined using the methods disclosed in U.S. application Ser. No. 17/502,825 filed 15 Oct. 2021 and U.S. application Ser. No. 15/253,488 filed 31 Aug. 2016, which are incorporated in their entireties by this reference.

Property attributes and attribute values are preferably determined asynchronously from method execution. Alternatively, property attributes and attribute values can be determined in real time or near real time with respect to the method. Attributes and values can be stored by the processing system performing the determination of property attributes, and/or by any other suitable system. Preferably, storage can be temporary, based on time (e.g., 1 day, 1 month, etc.), based on use (e.g., after one use of the property attribute values by the asset prediction model), based on time and use (e.g., after one week without use of property attribute values), and/or based on any other considerations. Alternatively, property asset data is permanently stored.

Attribute values can be discrete, continuous, binary, multiclass, and/or otherwise structured. The attribute values can be associated with time data (e.g., from the underlying measurement timestamp, value determination timestamp, etc.), a hazard event, an uncertainty parameter, and/or any other suitable metadata.

Attribute values can optionally be associated with an uncertainty parameter (e.g., each attribute value in a set is associated with an uncertainty parameter). Uncertainty parameters can include variance values, a confidence score, a probability, and/or any other uncertainty metric. In a first example, the uncertainty parameter is a probability associated with an attribute value. In an illustrative example, for an attribute of 'roof material', the attribute values can be: shingle, tile, metal, and other, wherein each attribute value is associated with a probability that the roof material of the property corresponds to the attribute value (e.g., the attribute values [shingle, tile, metal, other] can map to uncertainty parameters [0.9, 0.07, 0.02, 0.01]). In a second example, the uncertainty parameter is a confidence score. In a first illustrative example, the roof material attribute for a structure corresponds to attribute values: shingle with 90% confidence, tile with 7% confidence, metal with 2% confidence, and other with 1% confidence. In a second illustrative example, 10% of the roof is obscured (e.g., by a tree), which can result in a 90% confidence score for the roof geometry attribute value (e.g., an attribute value of 'shingle' has a 90% confidence score). In a third illustrative example, the vegetation coverage attribute value is 70%±10%. In a third example, the uncertainty parameter can be a variance for a given attribute value (e.g., across a set of properties such as a reference population, across an individual property, etc.). In an illustrative example, the parcel size attribute value across a set of properties (e.g., an aggregate attribute value for a reference population) can be 3000 ft$^2$ with a variance of 2000 ft$^4$.

The set of attribute values associated with each property can be represented as a vector (e.g., attribute vector), a multidimensional surface, a single value, and/or otherwise represented. For example, an attribute vector for a given property includes property-specific attribute values for each of a set of attributes (e.g., wherein the set of attributes can be selected using S200 methods). The values included in an attribute vector are preferably attribute values (e.g., exclusively attribute values), but can additionally or alternatively include uncertainty parameters (e.g., for attribute values), property identifiers, property information, and/or any other information for one or more properties. The order of attributes within each attribute vector and/or attribute set is preferably the same across different properties (e.g., the same across different vectors, the same across different sets, etc.), but can alternatively be different. The attribute vector can be any shape (e.g., an array, set, matrix of any dimension, etc.).

However, any other suitable property attribute and/or value thereof can be determined.

The system can include or use one or more attribute models, which function to determine attribute values for one or more property attributes. Each attribute model can determine values for a single attribute (e.g., be a binary classifier, be a multiclass classifier, etc.), multiple attributes (e.g., be a multiclass classifier), and/or for any other suitable set of attributes. A single attribute value can be determined using a single attribute model, multiple attribute models, and/or any other suitable number of attribute models.

Inputs to the attribute model, used to determine attribute values for a given property, can include property information (e.g., a property dataset) for the given property, property information for associated properties (e.g., neighboring properties), and/or any other suitable set of inputs. The property information can include: measurements, descriptions, auxiliary data, parcel data, and/or any other suitable information for the property. The property information can be associated with: a single property, a larger geographic context (e.g., based on a region larger than the property parcel size), and/or otherwise associated with one or more properties. The inputs can optionally be associated with a common timestamp, with a common timeframe (e.g., all determined within the same week, month, quarter, season, year, etc.), with different timeframes, and/or otherwise temporally related.

The outputs for the attribute model can be: values for one or more property attributes, image feature segments, property measurements, property identifiers, uncertainty parameters (e.g., a confidence score for each attribute value prediction), and/or any other suitable information.

The attribute value model can be or include: neural networks (e.g., CNN, DNN, etc.), an equation (e.g., weighted equations), regression (e.g., leverage regression), classification (e.g., binary classifiers, multiclass classifiers, semantic segmentation models, instance-based segmentation models, etc.), segmentation algorithms (e.g., neural networks, such as CNN based algorithms, thresholding algorithms, clustering algorithms, etc.), rules, heuristics (e.g., inferring the number of stories of a property based on the height of a property), instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministics, support vectors, genetic programs, isolation forests, robust random cut forest, clustering, selection and/or retrieval (e.g., from a database and/or library), comparison models (e.g., vector comparison, image comparison, etc.), object detectors (e.g., CNN based algorithms, such as Region-CNN, fast RCNN, faster R-CNN, YOLO, SSD—Single Shot MultiBox Detector, R-FCN, etc.; feed forward networks, transformer networks, and/or other neural network algorithms), key point extraction, SIFT, any computer vision and/or machine learning method (e.g., CV/ML extraction methods), and/or any other suitable model or methodology. Different attribute values can be determined using different methods, but can alternatively be determined in the same manner.

The attribute model can determine attribute values by: extracting features from property information (e.g., measurements) and determining the attribute values based on the extracted feature values, extracting attribute values directly from property information, retrieving values from a database or a third party source (e.g., third-party database, real estate listing service database such as an MLS database, city permitting database, historical weather and/or hazard database, tax assessor database, etc.), using a predetermined value, calculating a value (e.g., from an extracted value and a scaling factor, etc.), and/or otherwise determined.

However, the attribute model can be otherwise configured.

In examples, property attributes and/or values thereof can defined and/or determined as disclosed in U.S. application Ser. No. 17/529,836 filed on 18 Nov. 2021, U.S. application Ser. No. 17/475,523 filed 15 Sep. 2021, U.S. application Ser. No. 17/749,385 filed 20 May 2022, U.S. application Ser. No. 17/870,279 filed 21 Jul. 2022, and/or U.S. application Ser. No. 17/858,422 filed 6 Jul. 2022, each of which is incorporated in its entirety by this reference (e.g., wherein features and/or feature values disclosed in the references can correspond to attributes and/or attribute values). However, any other suitable property attribute and/or value thereof can be determined.

The system can include one or more typicality models, which function to determine the typicality metric for a property (e.g., with respect to a reference population).

Inputs to the typicality model can include: attribute values (e.g., attribute vectors) for the property and/or the reference population, property information for the property and/or the reference population, uncertainty parameters for the attribute values, and/or any other suitable inputs. Outputs of the typicality model can include one or more typicality metrics and/or uncertainty parameters for the typicality metric(s).

The model can be parametric (e.g., assume an underlying distribution), nonparametric (e.g., without an underlying distribution assumption), or a combination thereof. The typicality model can be or include: similarity models (e.g., configured to compute a similarity measure, such as a Bregman divergence, a Bhattacharyya distance, a Mahalanobis distance, cosine distance, etc.), neural networks (e.g., CNN, DNN, etc.), an equation (e.g., weighted equations), regression (e.g., leverage regression), classification (e.g., binary classifiers, multiclass classifiers, semantic segmentation models, instance-based segmentation models, etc.), segmentation algorithms, rules, heuristics, instance-based methods (e.g., nearest neighbor), regularization methods (e.g., ridge regression), decision trees, Bayesian methods (e.g., Naïve Bayes, Markov, etc.), kernel methods, statistical methods (e.g., probability), deterministics, support vectors, genetic programs, isolation forests, robust random cut forest, clustering, selection and/or retrieval (e.g., from a database and/or library), comparison models (e.g., vector comparison, image comparison, etc.), object detectors, SIFT, any computer vision and/or machine learning method, and/or any other suitable model or methodology.

The typicality model can be generic or be specific to: a use case (e.g., real estate valuation, insurance loss estimation, maintenance/repair cost, etc.), property information (e.g., available property information for the property and/or reference population), a property attribute value (e.g., each building classification is associated with a different typicality model), a geographic region (e.g., a continent, a country, a state, a county, a city, a zip code, a street, a neighborhood, a school district, etc.), a property class (e.g., single-family home, multi-family home, a house, an apartment, a condominium, etc.), a timeframe (e.g., a season, a week of the year, a month, a specific set of dates, etc.), a reference population size (e.g., greater or less than: 10 properties, 20 properties, 50 properties, 100 properties, 1000 properties, 10000 properties, or any number of properties) a terrain (e.g., forest, desert, etc.), a residential area classification (e.g., urban, suburban, rural, etc.), a zoning classification (e.g., residential area, industrial area, commercial area, etc.), and/or be otherwise generic or specific to one or more parameters.

In a first variant, the typicality model is a similarity model configured to determine a similarity score between an attribute value set for a property and the attribute value sets for each of a plurality of reference properties (the reference population). The similarity model preferably accounts for the covariance of the attribute values and/or distribution of the attribute values within the reference population, but can alternatively be agnostic to the attribute value covariance, be agnostic to the attribute value distribution within the reference population, and/or be otherwise configured.

In a second variant, the typicality model is a neural network trained to predict the typicality metric. In a first embodiment, the typicality model can predict the typicality metric based on property measurement(s) depicting the property and based on property measurement(s) depicting the reference properties. The property measurement(s) depicting the property and the property measurement(s) depicting the reference properties can be the same measurement(s) (e.g., a single image depicting the property and the reference properties), or be different. In this embodiment, the typicality model can be trained using a training data set including property measurements and training typicality metrics (e.g., calculated using the first variant) for each of a set of training properties. In a second embodiment, the typicality model can predict the typicality metric based on the attribute value set for the property and the reference properties.

However, the typicality model can be otherwise configured.

Models in the system (e.g., the typicality model, the attribute model, an attribute selection model, a reference population selection model, etc.) can optionally be trained on: labeled data (e.g., manually labeled data), real estate data (e.g., valuation data, sales data, inspection data, appraisal data, broker price opinion data, permit data, etc.), insurance claims data, synthetic data, and/or any other suitable ground truth training data set. The models can optionally be trained using supervised learning, unsupervised learning, semi-supervised learning, single-shot learning, zero-shot learning, and/or any other suitable learning technique.

The system can optionally include a database which can function to store property identifiers, property information (e.g., measurements, auxiliary data, etc.), attribute values, typicality metrics, reference population information (e.g., property sets), and/or any other information. The database can be local, remote, distributed, or otherwise arranged relative to any other system or module. In variants, the database can be or interface with a third-party source (e.g., third-party database, MLS database, city permitting database, historical weather and/or hazard database, tax assessor database, etc.), but can alternatively not interface with a third-party source. For example, information in the database can be retrieved, linked, or otherwise associated with information in a third-party source. In an example, a property identifier for each of a set of properties is stored in the database, wherein attribute values (e.g., extracted using S300 methods) are stored in association with the corresponding property identifier for all or a subset of the properties. Attribute values can optionally be edited and/or appended to the database when new property information (e.g., recent imagery or other measurements) is added. The database can be queried (e.g., based on a property identifier) to retrieve measurements, attribute values, typicality metrics, and/or any other information in the database.

The system can optionally include a computing system. The computing system can function to execute all or portions of the method, and/or perform any other suitable functionality. The computing system can be local (e.g., a user device such as a smartphone, laptop, desktop, tablet, etc.), remote (e.g., one or more servers, one or more platforms, etc.), distributed, or otherwise arranged relative to any other system or module. The computing system can include one or more: CPUs, GPUs, custom FPGA/ASICS, microprocessors, servers, cloud computing, and/or any other suitable components. The computing system can be used with a user interface (e.g., mobile application, web application, desktop application, API, database, etc.) or not be used with a user interface. The user interface can be used to: receive and/or input property identifiers and/or property requests, present attribute values, present typicality metrics, and/or otherwise used. The computing system can optionally interface with the databases.

5. Method

Figure 2:
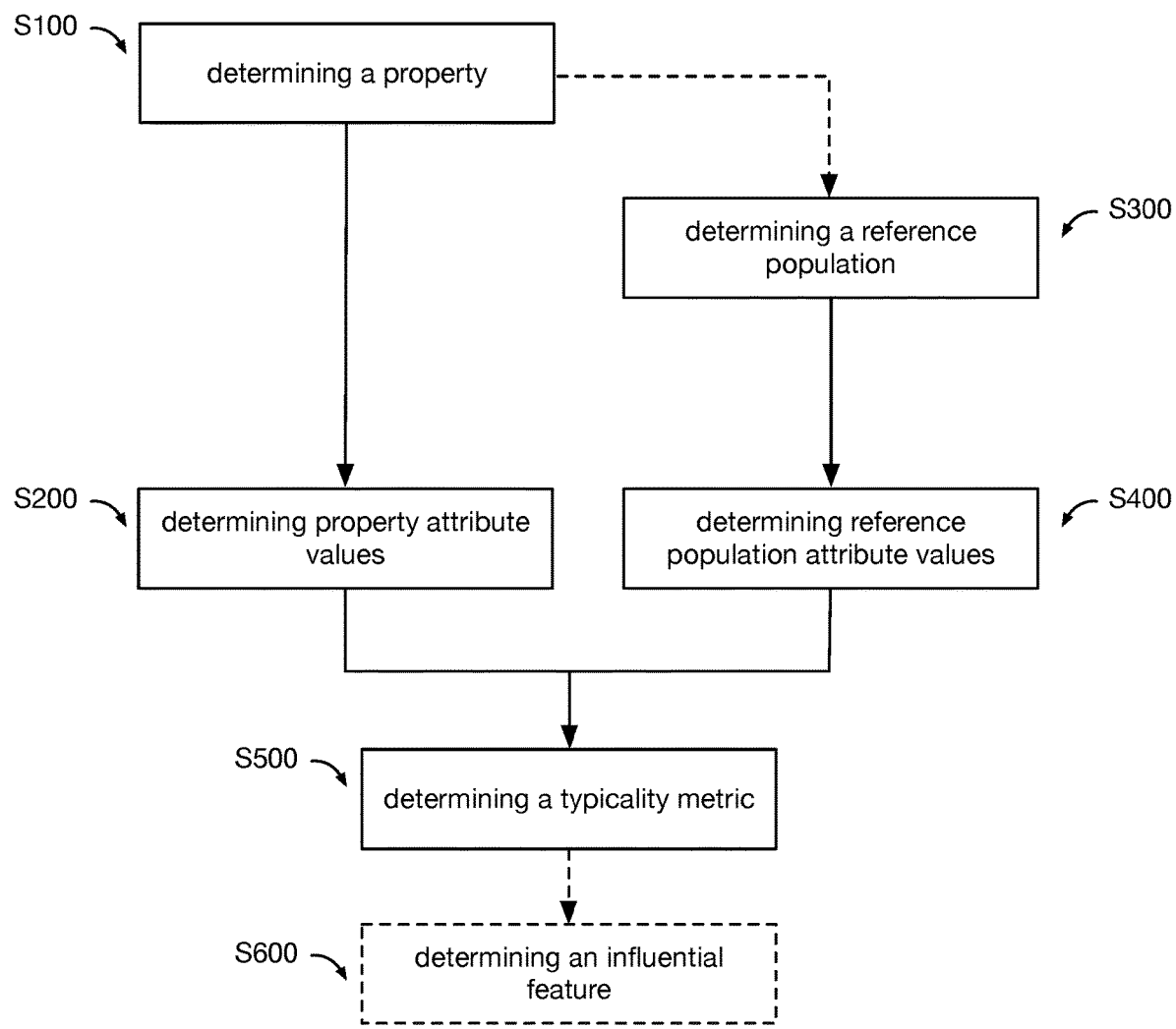
FIG. 2 is a schematic representation of a second variant of the method.

As shown in FIG. 1 and FIG. 2, the method can include: determining a property S100, determining attribute values for the property S200, determining a reference population for the property S300, determining reference population attribute values S400, determining a typicality metric for the property S500, and/or any suitable steps. The method can optionally include determining an influential attribute S600.

All or portions of the method can be performed for one or more properties (e.g., serially, in a batch, upon request, etc.). All or portions of the method can be performed in real time (e.g., responsive to a request), iteratively, asynchronously, periodically, and/or at any other suitable time. All or portions of the method can be performed automatically, manually, semi-automatically, and/or otherwise performed.

Determining a property S100 functions to identify a property (e.g., for comparison against the reference population, for typicality metric determination, etc.) and/or select a property (e.g., from a set of properties) for attribute value determination. S100 can be performed iteratively (e.g., for each of a set of properties in a database, for each of a set of properties in an image, etc.), in response to a request (e.g., received from a user, via an API, via a GUI, etc.), and/or at any other time.

S100 can include determining a single property, determining a set of properties (e.g., a plurality of properties, etc.), and/or any other suitable number of properties. When a single property is identified, the property (e.g., a property of interest) can be used to determine a reference population, for comparison against a reference population, for typicality metric determination, and/or for any other downstream methods. When a set of properties is identified, all or parts of the method can be iterated for each property in the set. For example, attribute values can be determined for each property in the set. In an illustrative example, a typicality metric is determined for one property in the set (e.g., wherein the remainder of the properties in the set are reference properties), wherein all or parts of the method can be iterated to determine typicality metrics for the other properties in the set. However, any identified property can be otherwise used.

In a first variant, the property can be determined based on a property identifier (e.g., received as part of a user request, retrieved from a database, etc.). The property can optionally be selected from a database (e.g., selected from a set of properties in the database) based on the property identifier. Each property identifier preferably identifies a single property (e.g., a 1:1 cardinality between property identifiers and properties), but alternatively can identify a set of properties (e.g., identify all properties associated with the property identifier) and/or more than one property identifier can identify a single property. In a second variant, the property can be determined based on a location (e.g., geographic region). One or more properties associated with the location can be identified (e.g., a single property, each property within a geographic region, a subset of properties within a geographic region, etc.). In a first example, the one or more properties can be extracted from a map, image, geofence, and/or any other representation of the location. In a specific example, the properties can be identified using image segmentation methods to extract each property within the geographic region. In a second example, one or more properties associated with the location can be identified based on an address registry, database, and/or any other suitable method. In a first illustrative example, all properties with a neighborhood are identified. In a second illustrative example, a subset of properties within a neighborhood (e.g., a subset of properties corresponding to one or more property attribute values) are identified.

However, one or more properties can be otherwise determined.

Determining attribute values for the property S200 can function to determine property-specific values associated with the property. S200 can be performed after S100 (e.g., for a single property, iteratively for a set of properties, in batches for sets of properties, etc.), in response to a request, when new property information (e.g., recent imagery or other measurements) associated with the property is received, before or after selecting attributes, at regular time intervals, and/or at any other time.

S200 can include determining one or more attribute values for each set of attributes, determining uncertainty parameters for all or a subset of attribute values, determining an attribute vector including attribute values and/or uncertainty parameters, and/or determining any other property-specific values.

Figure 4:
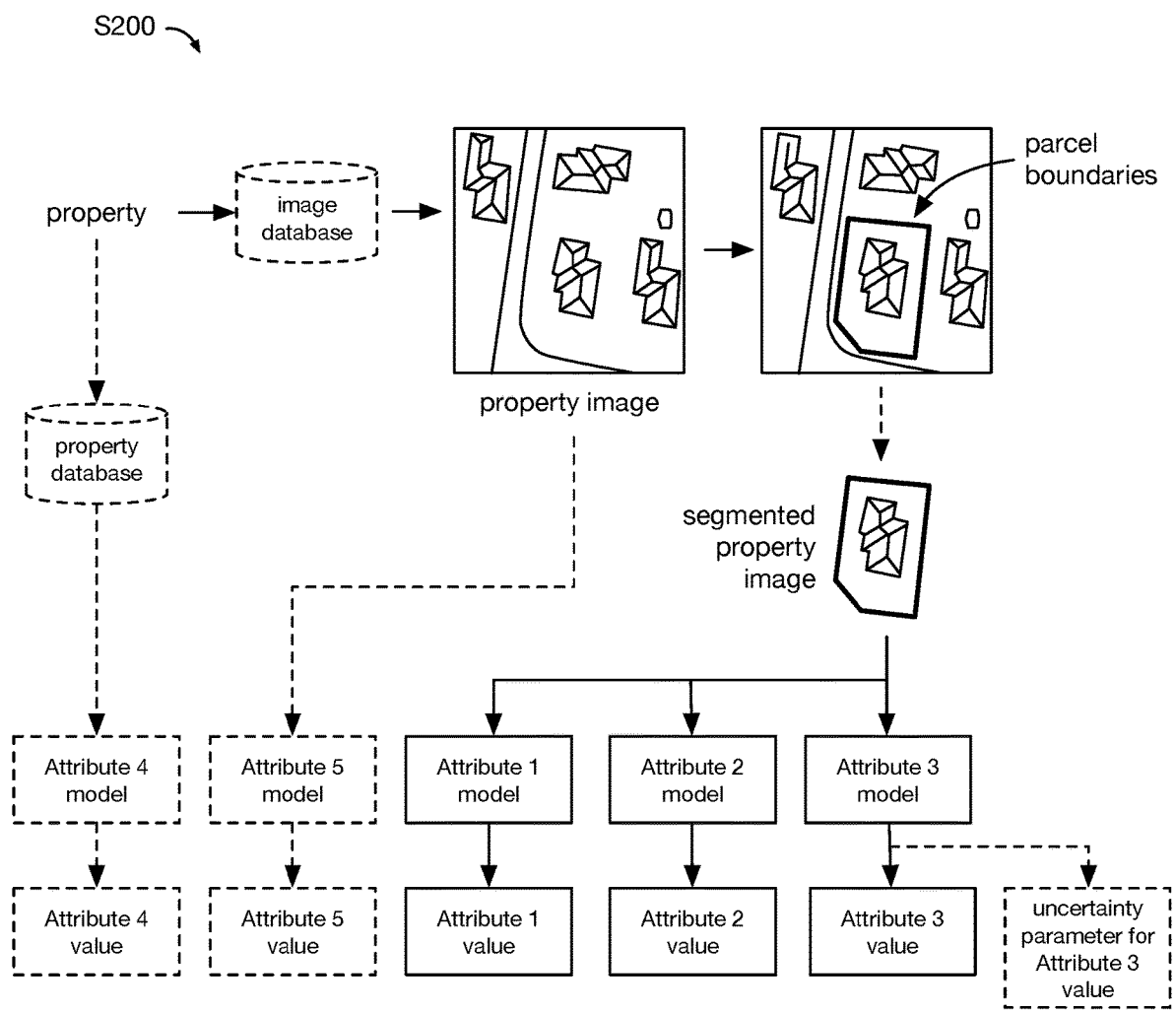
FIG. 4 depicts illustrative examples of determining attribute values for a property.

The value(s) for each property attribute within the property attribute set are preferably determined using one or more attribute models (e.g., wherein each attribute model is specific to a given attribute), but can additionally and/or alternatively be retrieved from a database, retrieved from a third-party (e.g., third-party database, real estate listing service database such as an MLS database, city permitting database, historical weather and/or hazard database, tax assessor database, etc.), determined using a different model, and/or otherwise determined. An example is shown in FIG. 4.

Attribute values can be determined based on property information (e.g., measurements, auxiliary data, parcel data, etc.) for the given property, property information for associated properties (e.g., neighboring properties), and/or any other suitable information. The property information can optionally be associated with a common timestamp, with a common timeframe (e.g., all determined within the same week, month, quarter, season, year, etc.), with different timeframes, and/or otherwise temporally related.

The attribute values can be determined by: extracting features from property information (e.g., measurements and/or measurement segments) and determining the attribute values based on the extracted feature values, extracting attribute values directly from property information, retrieving values from a database or a third party source (e.g., third-party database, real estate listing service database such as an MLS database, city permitting database, historical weather and/or hazard database, tax assessor database, etc.), using a predetermined value, calculating a value (e.g., from an extracted value and a scaling factor, etc.), and/or otherwise determined.

In a first variant, determining attribute values from the property data includes extracting features from images and determining the attribute values based on the extracted feature values. The feature values can be extracted from an image as a whole or from an image segment (e.g., segmented based on the property parcel outline, segmented based on one or more property components, etc.). In an illustrative example, the attribute model can extract visual features from an image (e.g., RGB image, depth measurement, etc.) of the property and determine an attribute of a property component (e.g., a roof geometry) for the property based on the extracted visual features. In a second variant, the attribute values are determined by applying a model or algorithm to other attribute values (e.g., calculating a structure footprint to parcel footprint feature value based on the structure square footage and the parcel square footage). In a third variant, the attribute values can be determined using a set of heuristics. For example, the number of stories of a property can be inferred based on the height of a property (e.g., based on the industry average height of a floor or story). The height of the property can be determined using another variant (e.g., retrieved from a database, from building permits, extracted from a digital surface map, etc.) or otherwise determined.

For example, attribute values can determined using the methods disclosed in U.S. application Ser. No. 17/529,836 filed on 18 Nov. 2021, U.S. application Ser. No. 17/475,523 filed 15 Sep. 2021, U.S. application Ser. No. 17/749,385 filed 20 May 2022, U.S. application Ser. No. 17/870,279 filed 21 Jul. 2022, and/or U.S. application Ser. No. 17/858,422 filed 6 Jul. 2022, each of which is incorporated in its entirety by this reference (e.g., wherein features and/or feature values disclosed in the references can correspond to attributes and/or attribute values).

S200 can optionally include determining uncertainty parameters for all or a subset of attribute values, The uncertainty parameter for an attribute value can be determined based on: the attribute model (e.g., an output of the model, based on the model itself, etc.), property information used to determine the attribute value (e.g., a percentage of a property component that is obscured, a timeframe associated with the input measurements indicating recency of the measurements, etc.), a set of attribute values (e.g., corresponding to a given attribute), and/or otherwise determined. In an illustrative example, the attribute model input is an image, and the output includes both the attribute value and an uncertainty parameter associated with the attribute value. In this example, the uncertainty parameter can be black box output from the attribute model, determined based on the attribute model itself, and/or otherwise determined using the attribute model.

In a first example, the uncertainty parameter can be used as a weight for the corresponding attribute value (e.g., used in S400 to aggregate attribute values across reference properties, used in S500 to weight attribute values when comparing property attribute values to reference population attribute values, etc.). In a second example, the uncertainty parameter can be used directly as an attribute value. In a specific example, uncertainty parameters can be compared in S500 (e.g., a distance is determined between two attribute vectors wherein one or more components of the attribute vectors includes an uncertainty parameter). In a third example, the uncertainty parameter can be used to determine a distribution metric in S550 (e.g., used to determine variance between properties, covariance between attributes, any statistical measure, etc.). In variants, the uncertainty parameter can increase the accuracy of typicality metric determination by more accurately comparing attribute values (e.g., wherein attribute values with high uncertainty have a smaller effect on the typicality metric).

S200 can optionally include selecting the set of attributes, wherein the set of attributes is selected from a superset of candidate attributes. This can function to: reduce computational time and/or load (e.g., by reducing the number of attributes that need to be extracted and/or processed), increase typicality metric prediction accuracy (e.g., by selecting the most predictive attributes, by reducing or eliminating confounding attributes, etc.), and/or be otherwise used. Attributes can be selected: from all available attributes, from attributes corresponding to a location (e.g., geographic region), attributes retrieved from a database, and/or any other superset of attributes.

The attribute sets can be the same or different across different properties, reference populations, locations, property classes, seasons, typicality models, and/or other parameters. For example, properties in two different neighborhoods can use two different attribute sets. In another example, typicality metrics calculated for winter can use a different attribute set than that for spring (e.g., the attribute set used to analyze winter measurements can be different from the attribute set used to analyze spring measurements).

The set of attributes can be selected: manually, automatically, randomly, iteratively and/or recursively, using an attribute selection model (e.g., a trained attribute selection model), using lift analysis (e.g., based on an attribute's lift), using explainability and/or interpretability methods (e.g., as described in S600), through typicality metric validation, based on an attribute's correlation with a training label or validation metric, using predictor variable analysis, during typicality model training (e.g., attributes with weights above a threshold value are selected), using a deep learning model, and/or via any other selection method or combination of methods.

In a first variant, the set of attributes is selected such that a typicality metric (for a given property) determined based on the set of attributes is indicative of a validation metric. The metric can be a metric used to validate a typicality model, a training target (e.g., used to train the typicality model), and/or any other metric. For example, the validation metric can be: AVM error (e.g., properties with high atypicality have high AVM error; properties with low typicality have low AVM error, etc.), historical valuation (e.g., the property's valuation compared to valuations of properties in the reference population; the price a property was: valued at, listed for, sold for, etc.; and/or any other valuation data), manual labeling, price discrepancy, days on market, insurance loss ratio (e.g., insurance loss divided by premium), a combination thereof, and/or any other metric. The attributes can be selected to: maximize a validation metric value, obtain a target validation metric valence (e.g., positive, negative, etc.), correlate the typicality metric with the validation metric, and/or otherwise selected. In an example, a statistical analysis of training data can be used to select attributes that have a nonzero statistical relationship (e.g., correlation, interaction effect, etc.) with the validation metric (e.g., positive or negative correlation with AVM error). In a specific example, the attribute selection model can be trained such that a typicality metric determined using the selected attributes correlates with maximal AVM error (e.g., properties identified as atypical based on attribute values for the selected attributes have maximal AVM error relative to other properties), wherein the AVM error is determined based on historical data (e.g., historical sale data) and a valuation calculation using the AVM.

In a second variant, the set of attributes is selected using a combination of an attribute selection model and a supplemental validation method. For example, the supplemental validation method can be any explainability and/or interpretability method (e.g., described in S600), wherein the selection method determines the effect an attribute has on the typicality metric. When this effect is incorrect or introduces biases (e.g., based on a manual determination using domain knowledge, based on a comparison with a validated typicality model, etc.), the attribute selection and/or the typicality model can be adjusted.

In a third variant, the set of attributes can be selected to include all available attributes.

In a fourth variant, the set of attributes can be manually selected.

However, the attribute set can be otherwise selected.

However, attribute values can be otherwise determined.

Determining a reference population for the property S300 can function to determine a set of reference properties for comparison against the property. S300 can be performed in response to S100 (e.g., determining a reference population for the property determined in S100), after S100, asynchronously from S100, iteratively (e.g., determining a reference population for each of a set of properties; assigning each of a set of properties to a reference population; etc.), and/or at any other suitable time.

The reference population can include one or more reference properties (e.g., including or not including the property). In a first example, the number of reference properties can be greater than a threshold number of properties, wherein the threshold can be between 5-100,000 properties or any range or value therebetween (e.g., 10, 50, 100, 1000, 10000, etc.), but can alternatively be less than 5 (e.g., a single property) or greater than 100,0000. In a specific example, the threshold number of properties can be determined such that statistical significance can be achieved in all or parts of S500 (e.g., in a statistical analysis performed on the reference population). In a second example, the number of reference properties is predetermined. In a specific example, the reference population includes a predetermined number of properties (e.g., 10, 100, 1000, 10000, etc.) that best satisfy a criterion (e.g., the 100 properties closest to the property). In a third example, the reference population includes all properties (e.g., any number of properties) that satisfy a set of criteria. In a fourth example, the reference population includes a single property. However, the reference population can include any number of properties.

The properties in the reference population can be predetermined, dynamically determined (e.g., each iteration of all or parts of the method, for each new property determined in S100, when new property information is received, upon request, etc.), and/or otherwise determined. The reference properties can be determined based on: a location (e.g., side of street, block, zip code, neighborhood, city, radius around the property, census block group, development/subdevelopment, any geographic region, etc.), attribute value (e.g., associated with the reference properties and/or the property), property information (e.g., associated with the reference properties and/or the property), received requests (e.g., attribute values and/or property information determined from a request), the typicality model (e.g., a different reference population for different typicality models), and/or any other parameters. The reference properties in the reference population can be determined (e.g., identified) using S100 methods and/or can be otherwise determined.

In a first variant, determining the reference population includes identifying properties that satisfy one or more criteria, wherein all or a subset of properties that satisfy the criteria can be selected as the reference population. The criteria can include: the reference property is associated with (e.g., matches) a predetermined parameter value (e.g., location, attribute values, measurements, reference population type, other property information, etc.), the reference property satisfies a threshold criterion relative to a parameter (e.g., physically located within a threshold distance of the property, attribute vector is within a threshold distance of the property attribute vector, etc.), the reference property is a best/closest match with respect to a parameter (e.g., the one or more properties physically located closest to the location of the property, the one or more properties with attribute values closest to attribute values for the property, etc.), and/or any other criterion. The criteria and/or a parameter used in the criteria can be predetermined (e.g., a default criterion), manually determined, determined via a received request, determined based on the property, and/or otherwise determined.

Examples of attribute values that can be used in a criterion include: location (e.g., geographic region, side of street, block, zip code, neighborhood, city, geofence, radius around the property, census block group, development/subdevelopment, etc.), location characteristic (e.g., rural, suburban, city, city greater than a threshold size, city less than a threshold size, distance to a city, distance to a school, etc.), property type/classification, property components (e.g., parcel size, number of bedrooms, number of bathrooms, roof type, roof condition, etc.), record attributes (e.g., built year, bed/baths, etc.), and/or any other attribute value. In a first example of an attribute value criterion, the reference population includes reference properties that are located with a threshold radius of a location associated with the property. The threshold radius can be between 1 mile-100 miles, or any range or value therebetween (e.g., 1 mile, 2 miles, 5 miles, 10 miles, 20 miles, 50 miles, etc.), but can alternatively be less than 1 mile or greater than 100 miles. In a second example of an attribute value criterion, the reference population includes reference properties with attribute values for a set of attributes that match corresponding attribute values for the property (e.g., exactly equal, closest match, match within a threshold similarity, etc.). In a specific example, the set of attributes can be attributes retrieved from a third-party database (e.g., number of beds and/or baths, construction style, year built, parcel size, building size, etc.). In a third example of an attribute value criterion, a combination of attribute value criteria can be used. In an illustrative example, all properties with a similar number of bedrooms that are also within a threshold radius of the property are selected as the reference population.

In an example of a measurement criterion, all or a subset of properties depicted in an image are selected as the reference properties. The image can be an image associated with the property (e.g., wherein the property is depicted at substantially the center of the image, wherein the image depicts a geographic region associated with the property, etc.), an image submitted via a request, an image retrieved from a database, and/or any image.

In a second variant, determining the reference population includes selecting properties to maximize and/or minimize a metric. In a first embodiment, the reference properties are selected to maximize/minimize the typicality metric for the property. In a specific example, the reference population is iteratively refined to maximize the typicality metric. In an illustrative example, the reference properties that maximize the typicality metric are real estate comparables ('comps') for the property. In a second embodiment, the reference properties are selected to maximize/minimize a validation metric (e.g., AVM error, historical valuation, manual labeling, price discrepancy, days on market, insurance loss ratio, etc.).

In a third variant, the reference population is determined using a reference population selection model. The input to the reference population selection model can be the property determined via S100 (e.g., a property identifier), attribute values (e.g., associated with the property), property information (e.g., associated with the property), and/or any other suitable inputs. The output of the reference population selection model can be one or more reference properties. The reference population selection model can be or include:

neural networks, equations, regression, classification, segmentation algorithms, rules, heuristics, instance-based methods, regularization methods, decision trees, Bayesian methods, kernel methods, statistical methods, deterministics, support vectors, genetic programs, isolation forests, robust random cut forest, clustering, selection and/or retrieval, comparison models, object detectors, key point extraction, SIFT, any computer vision and/or machine learning method, and/or any other suitable model. In a specific example, the reference population selection model can be trained on a set of training data, wherein the training data includes: a property (e.g., a property identifier, attribute values, property information, etc.) and a set of reference properties. The model can be trained to predict the set of reference properties based on the property (e.g., based on: the property identifier, attribute values, property information, etc.). In a specific example, the training data includes a set of available properties, wherein the set of reference properties is a labeled subset (e.g., manually labeled) within the set of available properties.

However, the reference population can be otherwise determined.

Determining reference population attribute values S400 functions to determine property-specific values and/or population specific values associated with the reference population. S400 can be performed after S300 (e.g., in response to determination of the reference population), prior to S300, and/or at any other time. In a specific example, attribute values can be determined for each reference property in the reference population prior to S300 (e.g., performed for all properties in a database, wherein the reference population is a subset of the properties in the database), wherein determining the reference population attribute values based on the individual reference property attribute values can occur after S300.

The reference population attribute values can include a set of attribute values (e.g., attribute vector) for each property within the reference population, an aggregate attribute value set (e.g., including a single aggregated value for each attribute in a set of attributes, wherein the aggregate value is based on the corresponding attribute values for each reference property), a set of attribute values derived from reference population information (e.g., directly extracted from measurements of a geographic region associated with the reference population), a combination thereof, and/or can be otherwise configured.

The reference population attributes and/or attribute values are preferably analogous to the property attributes and/or attribute values (e.g., to enable comparison), but can alternatively be non-analogous to the property attributes. In a first example, the reference population attribute values and the property attribute values can each correspond to the same set of attributes (e.g., the reference population attribute vector is analogous to the property attribute vector; the reference population attribute vector includes the same attributes, optionally in the same order, as the property attribute vector, etc.).

In a first variant, S400 includes determining attribute values for each property within the reference population (e.g., iteratively performing S200 for each reference property). Determining reference population attribute values can optionally include generating a set (e.g., an array) of attribute vectors (e.g., one attribute vector for each reference property). When measurements associated with the reference properties are used to determine the attribute values, the measurements can be from the same or different timeframes as measurements used to determine attribute values for the property (e.g., in S200).

Figure 5A:
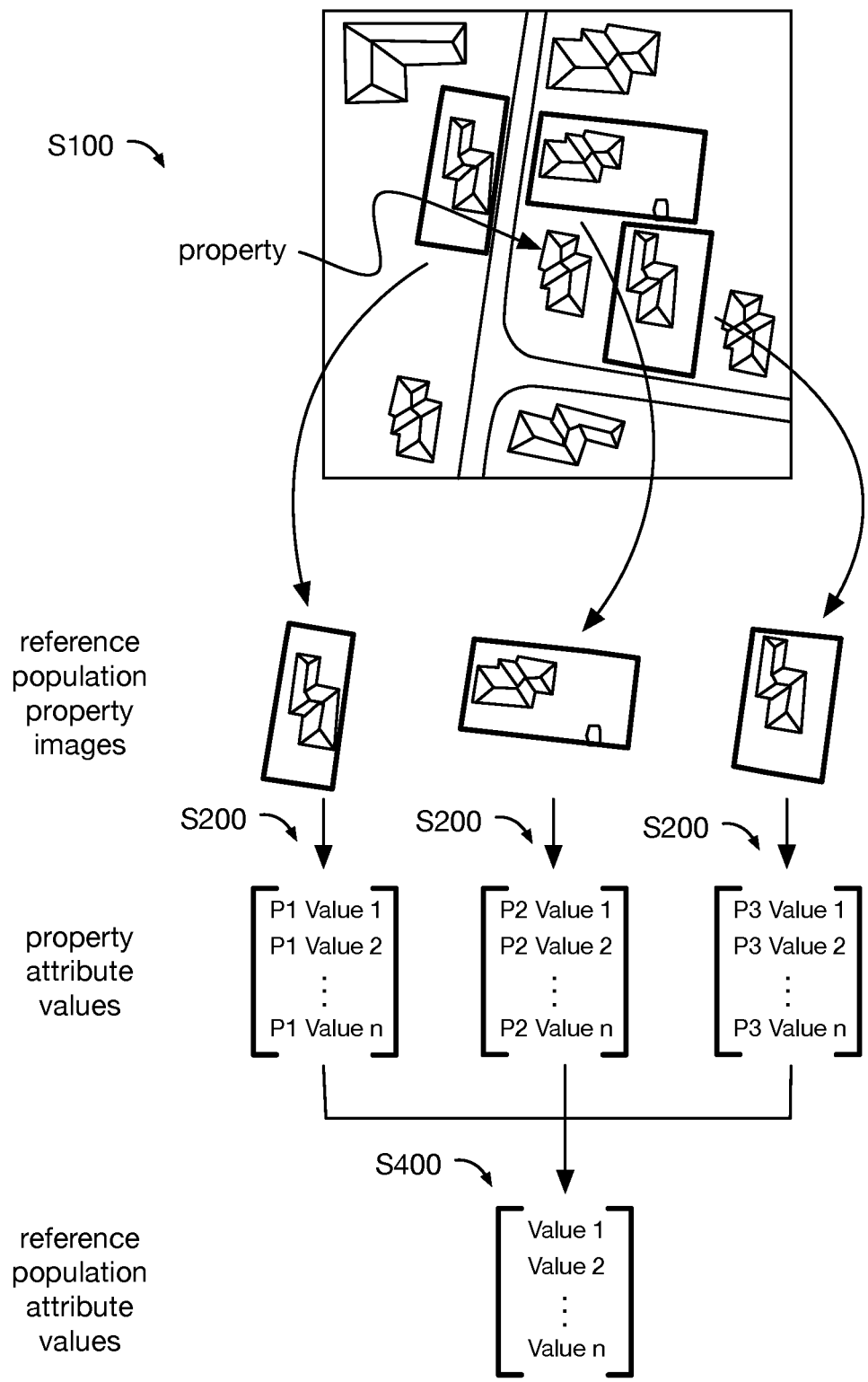
FIGS. 5A and 5B depict illustrative examples of determining attribute values for a reference population.
Figure 9:
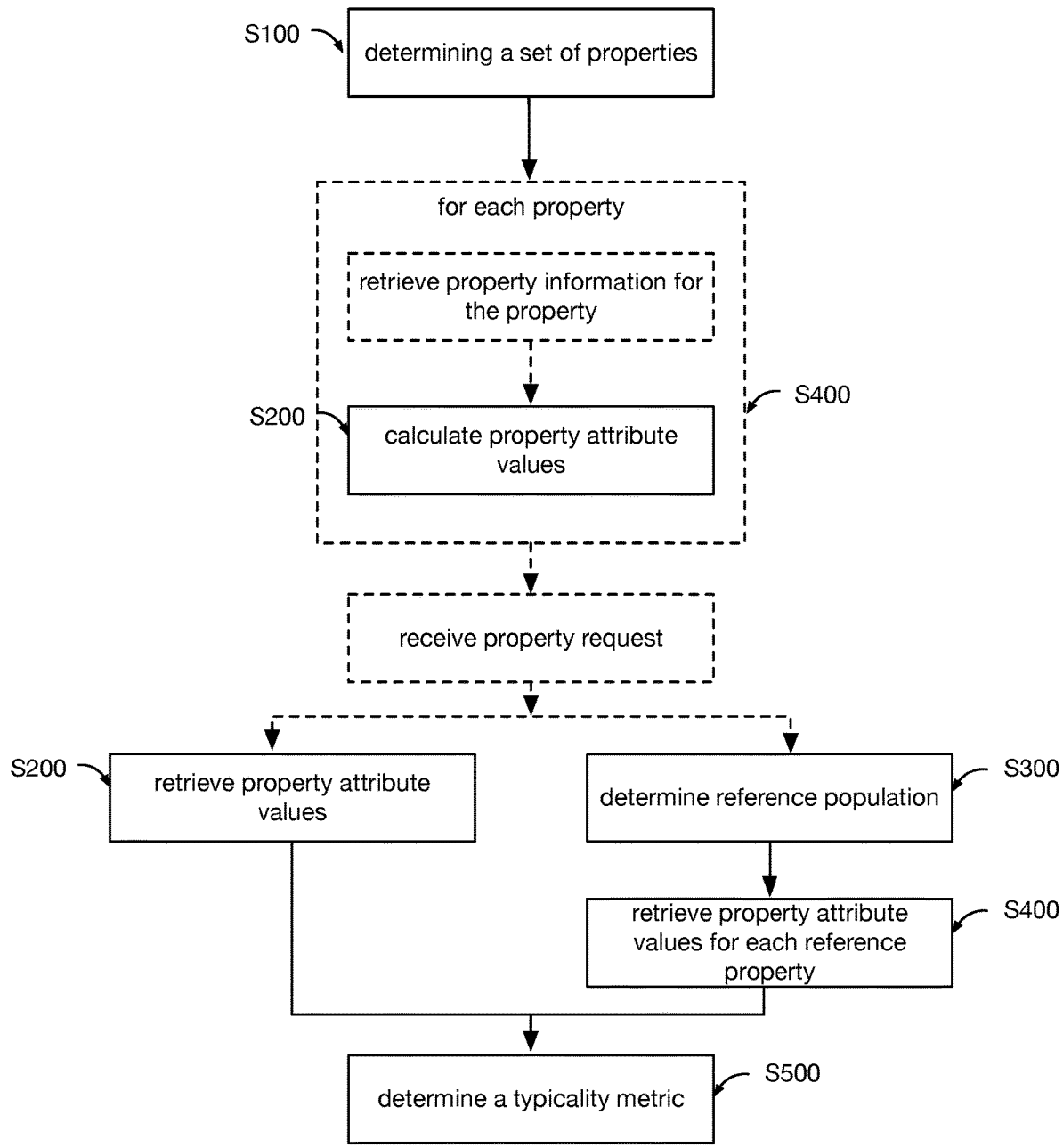
FIG. 9 is a schematic representation of an example of the method.

In a second variant, S400 includes performing the first variant and aggregating the attribute values for all or a subset of the reference properties to generate the reference population attribute values; example shown in FIG. 5A and FIG. 9. In a first example, aggregating the attribute values includes taking an average (e.g., weighted average) of attribute values for the reference properties (e.g., averaging attribute values across the reference properties for each attribute in a set of attributes; averaging reference property attribute vectors; etc.). In a first specific example, each attribute value is weighted based on an uncertainty parameter for the attribute value. In a second specific example, each attribute vector is weighted based on a weight for the associated reference property (e.g., wherein weights can be based on physical distance to property, based on similarity to criteria parameters in S300, etc.). In a second example, aggregating the attribute values includes determining a statistical measure (e.g., variance, standard deviation, interquartile range, range, maximum/minimum, etc.) for one or more attributes (e.g., based on the attribute values for each reference population). In a third example, aggregating the attribute values includes clustering the reference property attribute values (e.g., based on attribute values and/or any suitable parameter). In a fourth example, aggregating the attribute values includes selecting the one or more most common attribute values and/or attribute vectors to represent the reference population. In a fifth example, a combination of one or more of the previous examples can be used. In a specific example, a first set of attribute values can be aggregated using a first method, and a second set of attribute values can be aggregated using a second method. For example, attribute values corresponding to property components can be averaged, while uncertainty parameters for attribute values are aggregated using statistical methods (e.g., to result in an overall uncertainty parameter for the average attribute value). However, attribute values can be otherwise aggregated.

Figure 5B:
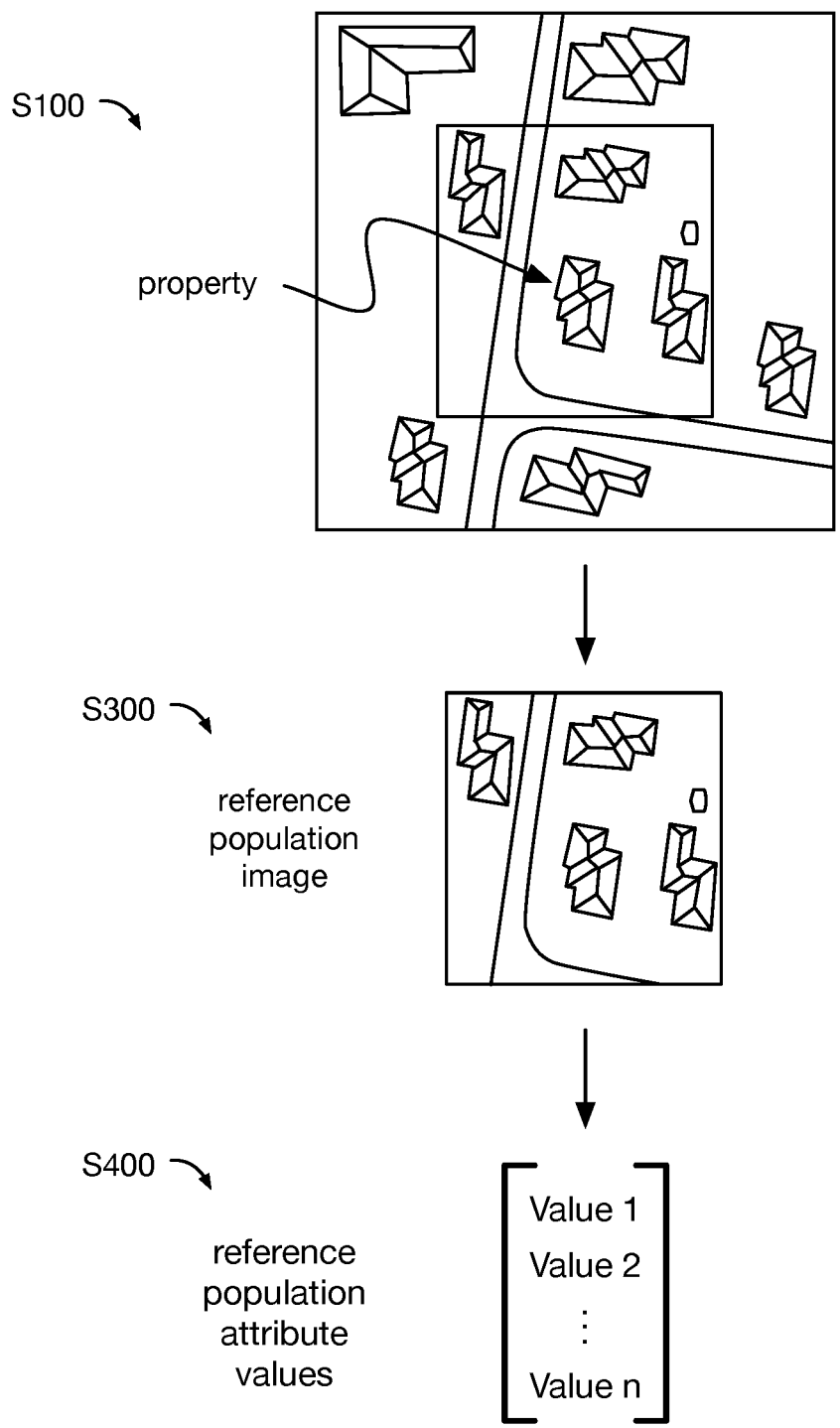

In a third variant, S400 includes determining attribute values directly for the reference population (e.g., without determining attribute values for individual reference properties). In a first example, the attribute values are determined based on an image associated with the reference population (e.g., an image depicting all or a subset of the reference properties); example shown in FIG. 5B. In a specific example, attribute values can be extracted directly from the overall image using an attribute model (e.g., without segmenting individual properties). In a second example, the attribute values can be determined based on property information for the reference population (e.g., for the reference population as a whole). In a specific example, the property information can be retrieved from a database (e.g., geographic region information, reference population type, etc.). In a third example, a combination of property information and measurements can be used to determine the reference population attribute values.

The reference population attribute values are preferably associated with the same timeframe as the attribute values for the property (e.g., determined in S200), but can alternatively be from a different timeframe. The duration of the timeframe can vary as a function of: the number of available reference properties, the geographic spread of the reference properties, and/or based on any other suitable variable. When measurements are used to determine reference population attribute values, the measurements can optionally be within a smaller timeframe for a smaller reference population (e.g., a smaller number of properties, a smaller geographic region, etc.) relative to a timeframe for a larger reference population. Alternatively, a larger timeframe can be used for a smaller reference population, the timeframes can be not associated with reference population size, and/or the measurements can be otherwise configured.

However, attribute values for the reference population can be otherwise determined.

Determining a typicality metric for the property S500 can function to determine how typical (e.g., similar, comparable, representative, etc.) or atypical (e.g., unique, complex, outlier, etc.) the property is with respect to the reference population. S500 can be performed after S200 and S400, be iteratively performed (e.g., for each property in a database, for each property in a set, for each of a set of reference properties with respect to a single property, for multiple sets of reference properties, etc.), and/or at any other suitable time. In a specific example, S500 can be performed for a single property. In a second specific example, S500 can be performed for each property in a set, wherein the reference population for each iteration includes the other properties in the set. The typicality metric can be stored in association with the property (e.g., in a database); returned via a user device, API, GUI, or other endpoint; and/or otherwise managed.

The typicality metric can be a label, classification, score, value, statistical measure, and/or any parameter. The typicality metric can be discrete, continuous, binary, multiclass, and/or otherwise structured. The typicality metric can additionally or alternatively include an uncertainty parameter (e.g., variance, confidence score, etc.).

The typicality metric and/or an uncertainty parameter for the typicality metric can optionally be determined based on variance and/or co-variance (e.g., variance in attribute values across reference properties, covariance between attributes, a covariance matrix based on attribute values for each reference property, etc.). In a first variant, one or more attribute values and/or attribute vectors can be normalized based on the variance of the reference population (e.g., normalized prior to determining typicality metric, during typicality metric determination, etc.). In examples, an attribute vector for each reference property is normalized, an aggregate attribute vector for the reference population is normalized, an attribute vector for the population of interest is normalized, and/or any other normalization can be performed. In a second variant, the typicality metric can be adjusted (e.g., normalized, increased/decreased, etc.) based on variance and/or co-variance. For example, the typicality metric can account for co-variance between attributes.

The typicality metric is preferably determined using a typicality model, but can alternatively be otherwise determined. The outputs for the typicality model can be: a typicality metric, an uncertainty parameter, and/or any other suitable information.

Inputs to the typicality model can include: attribute values (e.g., attribute vectors) for the property and/or the reference population, property information (e.g., measurements, auxiliary data, parcel data, etc.) for the property and/or the reference population, uncertainty parameters for the attribute values, and/or any other suitable inputs. In a first variant, the input includes an attribute vector for the property (e.g., determined via S200) and one or more attribute vectors for the reference population (e.g., determined via S400). In a second variant, the input includes a measurement (e.g., image) associated with the property and/or one or more measurements associated with the reference population. In a first example, the input includes analogous images (e.g., acquired during similar timeframes, acquired using similar methods, associated with similar image properties, etc.) for the property and for each reference property. In a second example, the input includes an image associated with the property and a composite image associated with the reference population. In specific examples, the composite image can be aggregated images for each reference property, an image of a geographic region depicting the reference properties, and/or any other image. In a third variant, the input includes both attribute vectors and measurements. One or more inputs can optionally be weighted (e.g., weighting inputs associated with each reference property based on a weight for the associated reference property; weighting attribute values and/or attribute vectors based on associated uncertainty parameters; weighting attribute values based on attribute importance, etc.). In specific examples, attribute importance can be determined in prior iterations of all or parts of the method (e.g., for the same or different properties), determined via S600 methods, determined during attribute selection, and/or otherwise determined.

Figure 10:
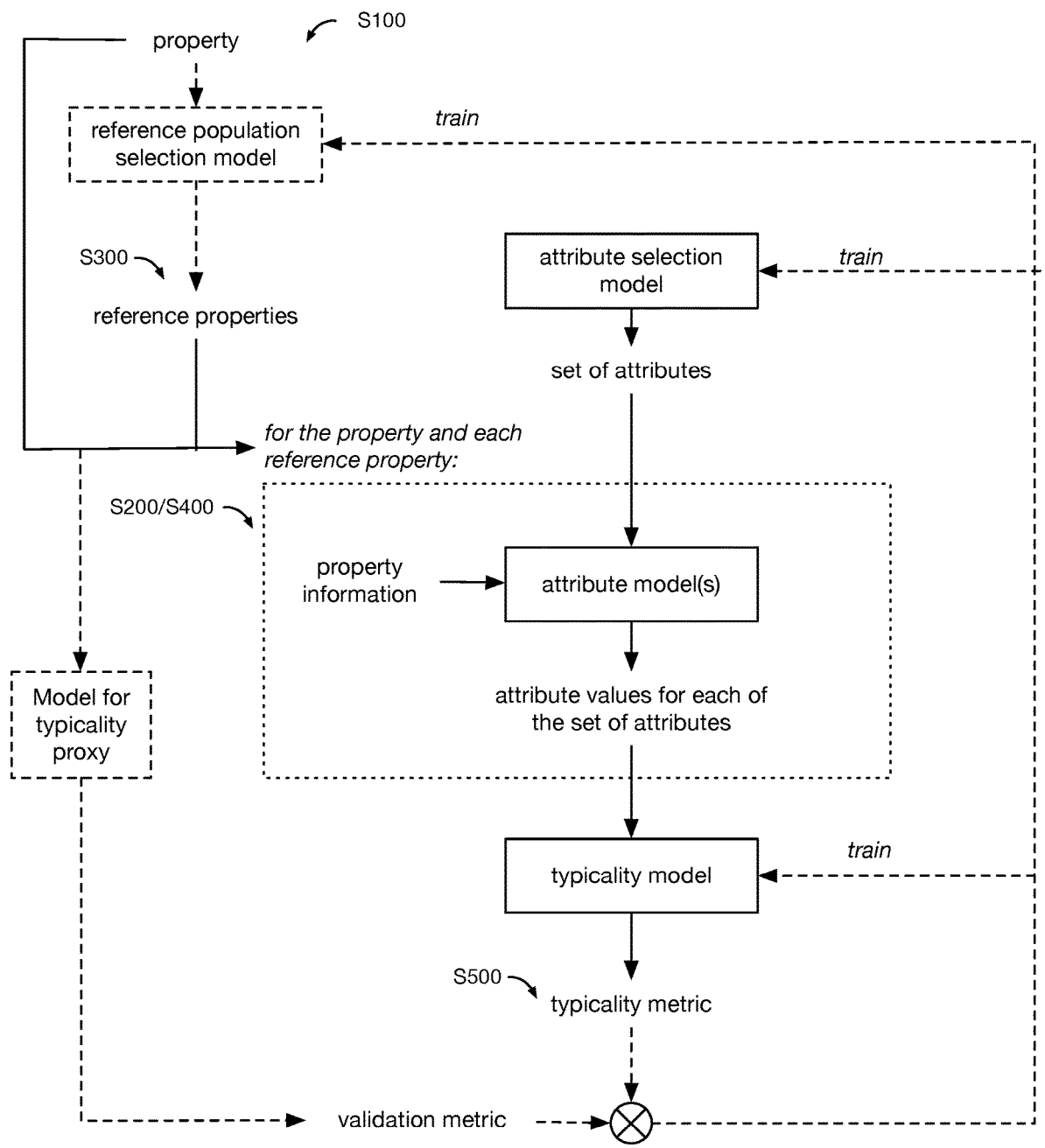
FIG. 10 is an example of model training.

The typicality model can optionally be trained (e.g., using supervised learning, unsupervised learning, semi-supervised learning, etc.). Training the typicality model can include: adjusting attributes (selecting attributes), adjusting weights (for properties, for attributes, for attribute vectors, for attribute values, etc.), refining the reference population, adjusting uncertainty parameter determination (e.g., for attribute values, for attribute vectors, for the typicality metric, etc.), adjusting comparison methods (e.g., distance calculations, clustering methods, etc.), and/or otherwise training the typicality model. In an example, the typicality model can be trained such that the typicality metric is correlated with a validation metric (e.g., AVM error, historical valuation, manual labeling, price discrepancy, days on market, a combination thereof, etc.). In an illustrative example of training the typicality model, training data includes: training inputs (e.g., attribute vectors, measurements, etc.) for a property and a reference population, and a validation metric for the property (e.g., with respect to the reference population). In this example, the typicality model can be trained to predict the validation metric (or trained to output a typicality metric correlated with the validation metric) based on the training inputs (e.g., example shown in FIG. 10). Additionally or alternatively, the typicality model can be validated using the validation metric. The validation metric can optionally be determined using a model (e.g., model for typicality proxy), wherein the model outputs the validation metric for a property based on property information (e.g., historical validation data for the property, AVM outputs for the property, etc.).

The typicality metric is preferably determined based on a comparison between the property attribute values and the reference population attribute values (e.g., which can include a single attribute value vector for the population or a plurality of attribute value vectors), but can be otherwise determined. The comparison can include: a statistical measure (e.g., leverage, which quartile the property attribute values fall into, etc.), a distance (e.g., between the property attribute vector and an aggregate reference population attribute vector; between the property attribute vector and a set of reference property attribute vectors; etc.), and/or any other suitable comparison. Examples of distances that can be used include: Bregman divergences (e.g., Mahalanobis distance), Bhattacharyya distance, Hamming distance (e.g., wherein the attribute vectors are treated as strings), Hellinger distance, models trained to determine a distance metric (e.g., using similarity learning or metric learning), a distance derived from a Gaussian mixture model, a multi-modal distance algorithm, and/or any other suitable distance or method. Additionally or alternatively, a trained model (e.g., a trained black box model) takes in property information (e.g., measurements, attribute values, etc.) for the property and for the reference population (e.g., for each reference property, for the entire reference population as a whole), and outputs the typicality metric.

Figure 6A:
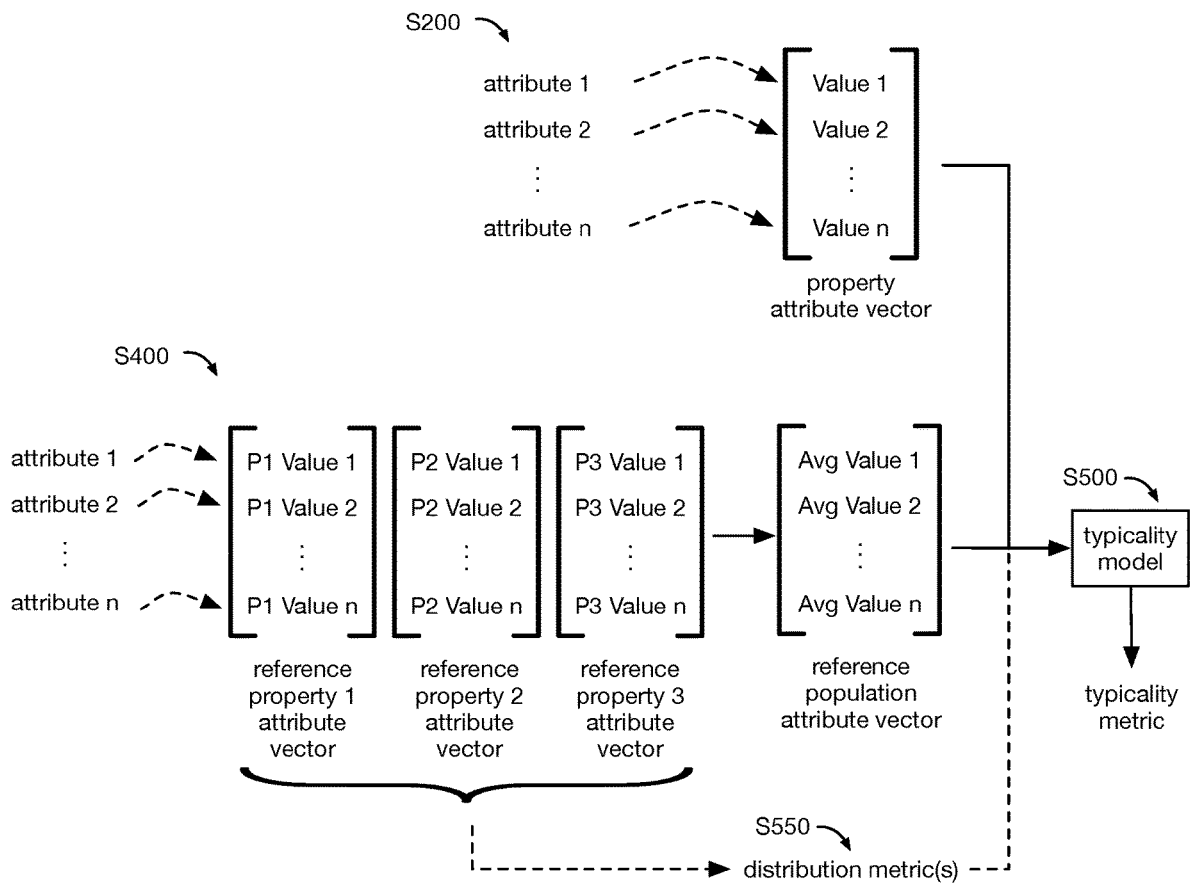
FIGS. 6A and 6B depicts examples of determining a typicality metric based on attribute vectors.
Figure 6B:
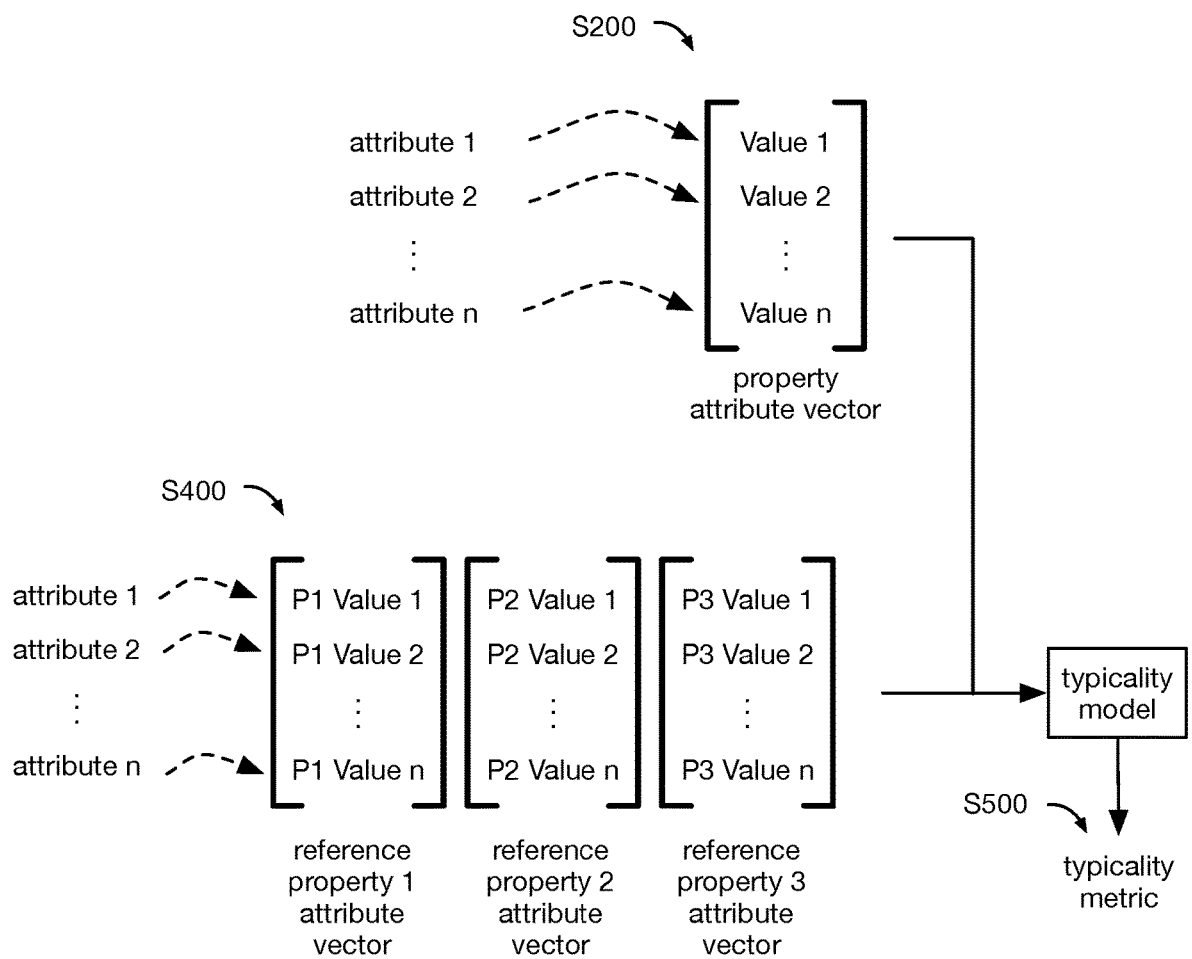

In a first variant, S500 includes determining the typicality metric based on an attribute vector comparison. In this variant, the attribute values for the property and for the reference population can each include one or more vectors (e.g., array, set, point in n-dimensional feature space, etc.). The property attribute vector(s) and the reference population attribute vector(s) can then be compared; examples shown in FIG. 6A and FIG. 6B.

The typicality metric can be a comparison output (e.g., the distance metric, the variance thereof, whether the property is an outlier or not, etc.) or be determined from the comparison output (e.g., calculated, scaled, binned into a labeled bin, etc.). In a specific example of determining the typicality metric from the comparison output, a distance metric is determined for each of a set of properties, wherein the properties are binned based on the associated distance metrics (e.g., binned into discrete groups 1-10). The number of bins can be between 1-1000 or any range or value therebetween (e.g., 100, 50, 10, 5, etc.). The binning can be uniformly distributed (e.g., decile groups with an equal number of properties in each bin), nonuniformly distributed, normally distributed, and/or have any other distribution. The distribution can be across the properties (e.g., the same number of properties are in each bin), by distance metric value (e.g., each bin encompasses the same number of metric values), and/or across any other suitable dimension. Each bin preferably corresponds to a typicality metric (e.g., wherein each property in the bin has the same typicality metric), but alternatively the typicality metric can be otherwise determined based on the bin. For example, properties with the longest distance metrics are binned into group 10 with a typicality metric of 10, and properties with the shortest distances are binned into group 1 with a typicality metric of 1. However, the typicality metric can be otherwise determined from the comparison output. In variants, a model (e.g., ML model, neural network, etc.) can be trained to predict the bin based on the attribute values for a given property (e.g., wherein the model can be trained on attribute value sets paired with bin identifiers determined using the method described herein).

In a first embodiment of the first variant, the distance between vectors is determined using: Mahalanobis distance, cosine distance, Euclidean distance (e.g., dimensionality reduction and Euclidean distance, Euclidean distance in feature space, etc.), and/or any other method. For example, the distance can be between a property attribute vector and an aggregate reference population attribute vector (e.g., vector of averaged attribute values). The distance can optionally be based on a distribution metric associated with the reference population (e.g., wherein the distribution metric is determined in S550). In a first example, the distance can be determined in an n-dimensional feature space. In a first specific example, the feature space is determined based on the distribution metric (e.g., an axis of feature space is determined to maximize variance along that axis). In a second specific example, the feature space is learned. In a second example, the aggregate reference population attribute vector can be based on the distribution metric (e.g., the reference property attribute vectors are aggregated based on variance and/or co-variance across attribute values). In a second example, the distribution metric can be used determine whether the property vector is an outlier (e.g., based on the vector distance), wherein the distribution metric is a statistical analysis of the reference population (e.g., standard deviation, IQR, etc.). In a third example, non-normal distributions (e.g., for the reference population, for one or more attributes, etc.) can be accounted for (e.g., using a nonparametric typicality model) based on the distribution metric. In a specific example, the reference property attribute vectors can form a multimodal distribution. In this example, the distance can be based on a Gaussian mixture model (e.g., a mixture of Gaussian distributions representing the overall distribution), any multi-modal distance algorithm, a distance between property attribute vector and one or more representative reference population attribute vectors, and/or otherwise determined. In examples, the representative reference population attribute vector can be: an attribute vector representing a single mode within the distribution, an attribute vector representing a subpopulation of the reference properties (e.g., a centroid of a distribution of the subpopulation, wherein the subpopulation is determined using a Gaussian mixture model and/or any other mixture model), and/or any other representative reference population attribute values. In an illustrative example, the typicality metric can be the shortest distance of the set of distances between the property attribute vector and each of a set of representative reference population attribute vectors (e.g., the distance is the typicality of the property relative to the closest matching subpopulation of reference properties). In this illustrative example, the subpopulation can be an identified subset of reference properties similar to the property (e.g., used as valuation 'comps').

Figure 8A:
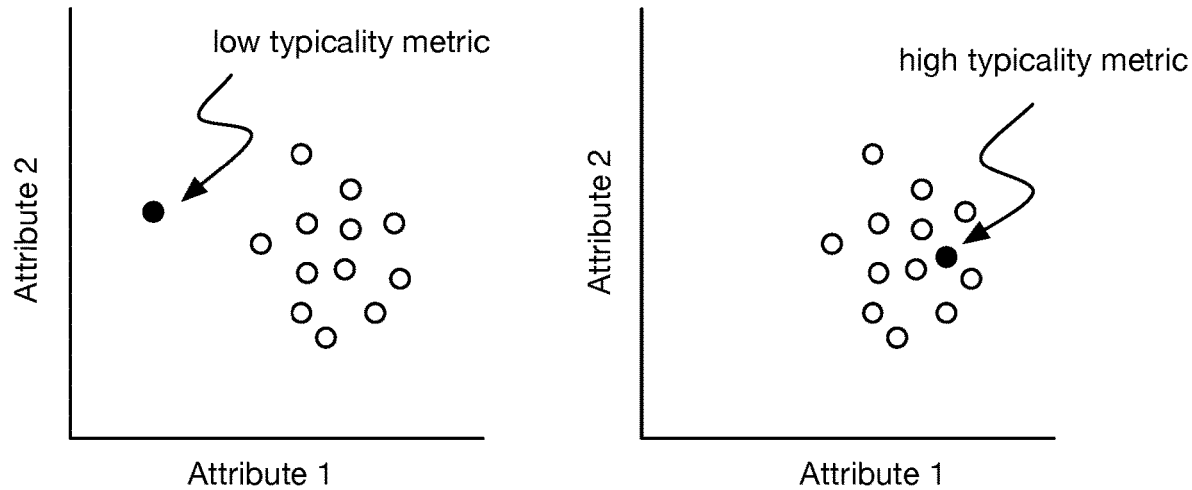
FIGS. 8A and 8B depict illustrative examples of determining a typicality metric.
Figure 8B:
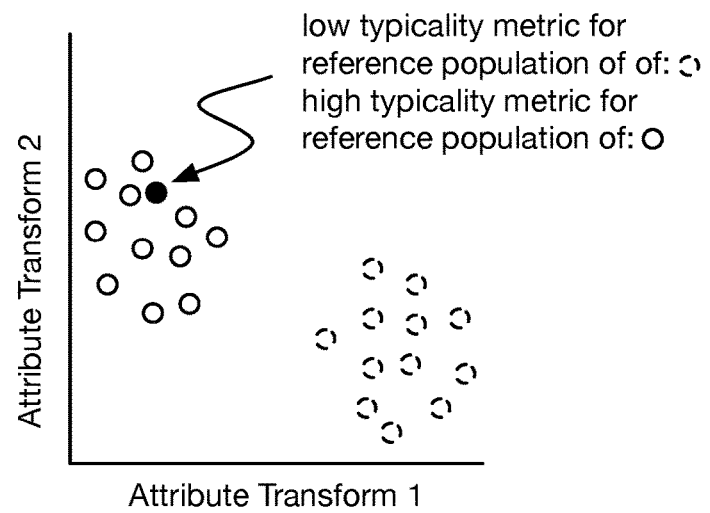

In a second embodiment of the first variant, clustering is used, wherein the typicality metric is determined based on the distance between the property attribute values and the cluster of reference property attribute values (e.g., cluster centroid, cluster values, etc.); example shown in FIG. 8A and FIG. 8B. Each property (e.g., the property determined via S100 and the reference population properties determined via S300) can be associated with a set of attribute values occupying one or more points in n-dimensional space. In one example, S500 includes using a density-based clustering algorithm, local outlier factor, one-class SVM (e.g., wherein the typicality metric is based on the decision function of a one-class SVM), K nearest neighbors algorithm, DBSCAN, locality-sensitive hashing, isolation forest, and/or any other algorithm. In another example, the reference population properties are clustered based on one or more classifications (e.g., house type, residential area class, zoning class, etc.), wherein the property can be compared against the one or more clusters to produce one or more typicality metrics. The reference population cluster can optionally include multiple centroids (e.g., indicative of multiple property archetypes), wherein the typicality metric can be determined based on a distance to one or more of the centroids.

In a third embodiment of the first variant, the typicality metric can be determined using isolation forests and/or any other decision tree method. For example, an isolation forest can be generated based on the property attribute values (e.g., the property and reference population attribute values). In a first specific example, the typicality metric for a property can be based on the path length of the property attribute values (e.g., average path length for the property across a multi-dimensional isolation forest, a path length for the property relative to the average path length for the isolation forest, etc.). In a second specific example, the typicality metric can be an overall typicality metric for a population, wherein the typicality metric is a statistical measure of the path lengths in the isolation forest (e.g., average path length, median path length, a distribution of path lengths, etc.).

In any variant, attribute values can be transformed (e.g., to project attribute value vectors from n-dimensions to 2-dimensions prior to vector comparison). The transformation can be performed via dimensionality reduction, projection, rescaling, principal component analysis, using a distribution metric (e.g., based on variance and/or co-variance), using embedding methods, and/or otherwise transformed to a feature space (e.g., metric space). In a first specific example, the attribute values can be transformed to an n-dimensional space wherein at least one axis in the n-dimensional space is selected to be the axis of greatest variance. In a second specific example, the attribute values can be transformed to an embedding (e.g., a learned embedding, a common embedding, etc.). In this example, the embedding can be a space where attribute values for similar properties (e.g., the reference properties, comparables, etc.) are embedded near each other, wherein the typicality metric can be determined based on embedding density (e.g., a local density at the embedding location for the property attribute values), a distance in the embedding (e.g., distance between the property attribute values and a centroid of the reference population attribute values, a distance between the property attribute values and the nearest reference property attribute values), and/or any other typicality metric.

Figure 7:
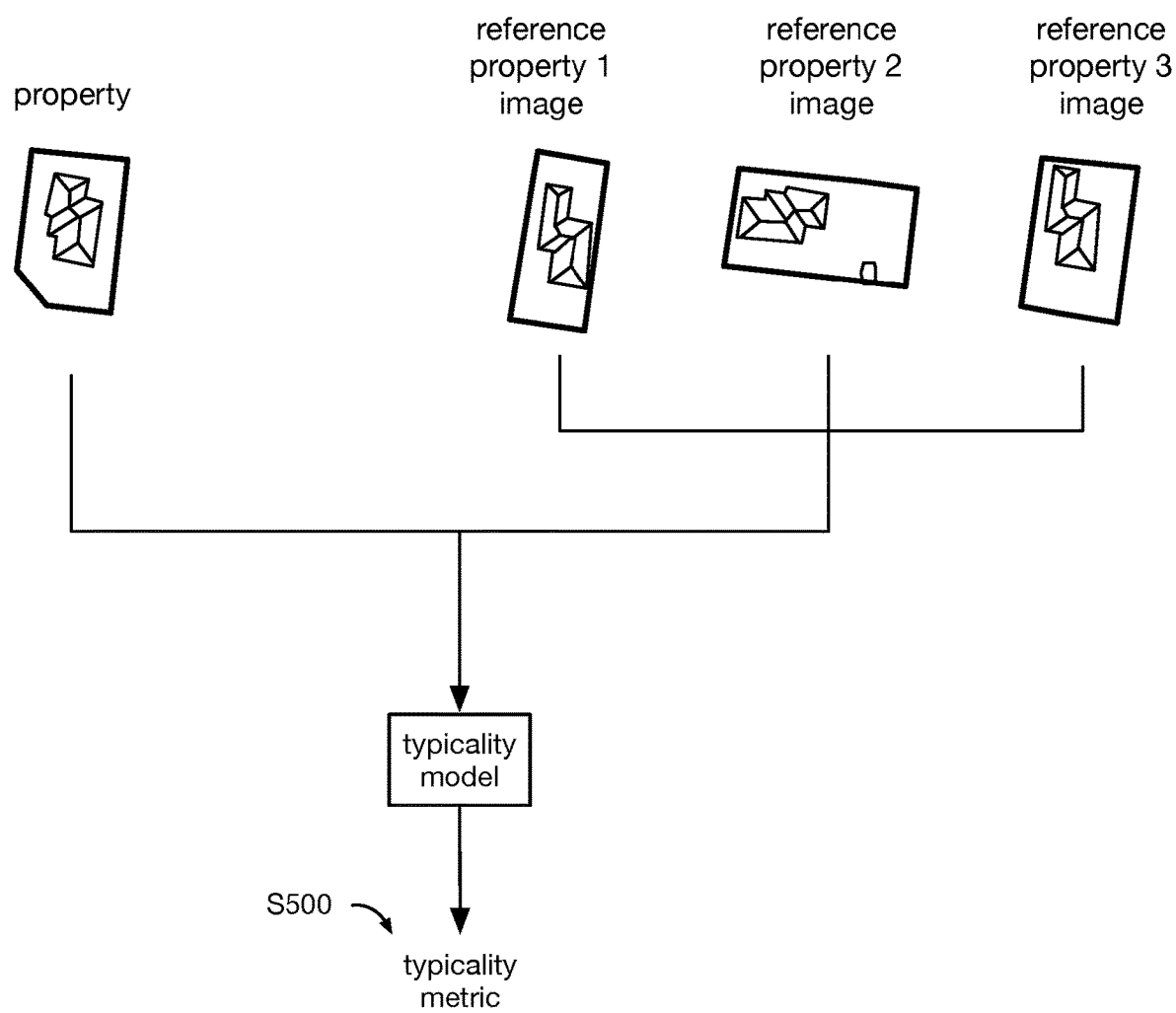
FIG. 7 depicts an example of determining a typicality metric based on property measurements.

In a third variant, S500 includes an image-to-image comparison (e.g., example shown in FIG. 7). This can be performed with or without calculating attribute values for the property and/or the reference population (e.g., attribute values are not directly extracted from images/segmented images in S200 and S400). In one embodiment, S500 includes generating a composite image for the reference population, wherein the property image is compared against the composite image. The image-to-image comparison can use key point matching, image transforms, perceptual hash, image feature histograms, and/or any other image analysis technique. In another embodiment, images for one or more properties can be inputs in a deep learning model. In an example, the deep learning model can be trained such that the typicality metric is correlated with a validation metric (e.g., based on historical valuation data, AVM error, etc.). S500 can additionally or alternatively feature any other image analysis/comparison/evaluation method in determining the typicality metric.

In a fourth variant, a neural network classifier is used to determine the typicality metric. The classifier can ingest attribute values (e.g., attribute vectors) associated with the property and the reference population, then output a typicality metric (e.g., typicality class-typical vs atypical; typicality metric, etc.). The classifier can be trained using a validation metric and/or any other suitable data. For example, each training property can be assigned a typicality metric based on AVM error, wherein the classifier can be trained to predict the assigned typicality metric based on the training property's attribute values. However, the classifier can be otherwise trained.

In a fifth variant, determining the typicality metric can include: determining a vector representative of the appearance and/or geometry for a property of interest (e.g., from property measurements, such as imagery and/or geometric measurements; using a trained encoder; etc.); determining a vector representative of the appearance and/or geometry for each of a set of comparison properties; and determining the typicality metric for the property of interest relative to the set of comparison properties based on the respective vectors (e.g., by calculating a similarity score, etc.). The vectors can be extracted by the same or different models. In examples, the model can be trained to output the same vector for a given property, irrespective of common or transient changes (e.g., changes in lighting, shadows, tree coverage, transient debris, etc.). In an example, the model can be trained using the methods disclosed in U.S. application Ser. No. 18/074,295 filed 2 Dec. 2022 titled "System and Method for Change Analysis" and claiming priority to U.S. Provisional Application No. 63/290,174 filed 16 Dec. 2021 and/or U.S. Provisional Application No. 63/350,124 filed 8 Jun. 2022, incorporated herein in its entirety by this reference, wherein the vectors can be the vectors disclosed in the referenced application. However, other models can be used. However, other models can be used.

However, the typicality metric can be otherwise determined.

The method can optionally include determining a distribution metric S550, which can function to determine a metric associated with the distribution of attribute values for a population of properties (e.g., wherein the distribution metric can optionally be used in S500). The population is preferably the reference population but can be another property population (e.g., a subset of the reference population). The distribution metric can include: interquartile range, modality, spread, standard deviation, range, variance (e.g., covariance; a covariance matrix; an axis of greatest variance; etc.), a classification, cluster metrics, geometric parameters (e.g., ellipse/ellipsoid: axes, height/width, center point, foci, etc.) of the attribute values (e.g., in reduced dimensions), maximum/minimum, any statistical measure, and/or any other suitable metric. In a specific example, the typicality metric for a property is determined based on a distribution metric for the reference population (e.g., the typicality metric accounts for variance/covariance; the distribution metric can be used to determine whether the property is an outlier; etc.). However, distribution metrics can be otherwise determined and used.

The method can optionally include identifying reference properties (e.g., a subset of the reference population) that are similar to the property, wherein the identified reference properties can be used as comparables (e.g., 'comps' for valuation or insurance quoting), used as an updated reference population (e.g., a refined reference population) for future iterations of all or parts of the method, stored in a database, returned to a user (e.g., via a user device, API, GUI, other endpoint, etc.), used to train the reference population selection model, and/or be or otherwise used. In a first specific example, the subset of reference properties can be used to determine an estimated valuation for the property (e.g., based on known valuation information for the subset of reference properties). In a second specific example, one or more reference property subsets can be used to determine a feature space (e.g., an embedding) for property attribute values, wherein the attribute values for reference properties in a subset are close together in the feature space. For example, the feature space can be trained to minimize the distance between attribute values for reference properties (e.g., comparables) in a reference property subset.

The subset of reference properties can be determined based on: an attribute value comparison between the property and one or more of the reference properties (e.g., deemed similar when the attribute vector distance is below a threshold value, using any comparison method in S500, etc.), based on one or more typicality metrics, based on selected attributes (e.g., attributes selected using the attribute selection model), and/or otherwise determined. In a first specific example, typicality metrics can be iteratively calculated for subsets of the reference population, wherein the subset with the highest typicality metric is selected as similar to the property (e.g., selected as comparables). In a second specific example, a typicality metric can be determined for each of a set of properties (e.g., for each reference property, for each property in a geographic region, etc.), wherein properties with similar typicality metrics are selected as similar. An uncertainty parameter can optionally be associated with the subset of reference properties (e.g., wherein the uncertainty parameter can represent a predicted similarity between the valuation of a property of interest and the valuation of the subsets of reference properties). The uncertainty parameter can be determined based on: the typicality metric for the property of interest, the typicality metric for each property in the subset of reference properties (e.g., a comparison between the typicality metric for the property of interest and the typicality metrics for the subset of reference properties), and/or otherwise determined. The uncertainty parameter can be determined using probabilistic uncertainty analysis (e.g., Monte Carlo methods), deterministic uncertainty analysis, and/or any other uncertainty quantification methods.

However, a subset of reference properties can be otherwise identified.

The method can optionally include determining an influential attribute S600. S600 can function to explain a typicality metric (e.g., why a property is typical or atypical, what attribute(s) are causing the typicality metric model to output a typicality metric indicating that the given property is atypical, etc.). S600 can occur automatically (e.g., for each property), in response to a request, when a typicality metric falls below or rises above a threshold, and/or at any other time.

S600 can use explainability and/or interpretability techniques to identify property attributes and/or attribute interactions that had the greatest effect in determining a given typicality metric. The influential attribute(s) (e.g., key attribute(s)) and/or values thereof can be provided to a user (e.g., to explain why the property is atypical), used to identify errors in the data, used to identify ways of improving the typicality model and/or the attribute selection model, and/or otherwise used. S600 can be global (e.g., for one or more typicality metric models used in S500) and/or local (e.g., for a given property and/or property attribute values).

S600 can include any explainability and/or interpretability method, including: local interpretable model-agnostic explanations (LIME), Shapley Additive exPlanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), surrogate models, attribute summary generation, and/or any other suitable method and/or approach. In an example, one or more high-lift attributes for a property typicality metric determination are returned to a user. Any of these interpretability methods can alternatively or additionally be used in selecting attributes.

However, one or more influential attributes can be otherwise determined.

6. Use Cases

All or portions of the methods described above can be used for automated property valuation, for insurance purposes, for rental analysis (e.g., rental value, vacancy estimation, renovation costs, etc.), and/or otherwise used. For example, any of the outputs discussed above (e.g., for the property, for the reference population, etc.) can be provided to an automated valuation model (AVM), which can predict a property value based on one or more of the attribute values (e.g., feature values), generated by the one or more models discussed above, and/or attribute value-associated information. The AVM can be: retrieved from a database, determined dynamically, and/or otherwise determined.

In examples, the typicality metric can be used to determine a property metric and/or used as a proxy for a property metric. In particular, the typicality metric can determine or infer: AVM error (e.g., properties with high atypicality have high AVM error; properties with low typicality have low AVM error, etc.), insurance loss ratio (e.g., insurance loss divided by premium), property investment risk, days on the market, valuation certainty, an estimated valuation, price discrepancy (e.g., from another property, from an average price), a combination thereof, and/or any other value or assessment.

The typicality metric can optionally be used with: personal lines insurance (e.g., rating, inspection optimization, etc.), real estate property investing (e.g., identify underpriced and/or overpriced properties-atypically good and/or atypically bad; determine risk, etc.), real estate loan trading (e.g., use typicality metric as an input into a model that predicts probability of default; at the pre-bid analysis stage and/or the due diligence stage for Non Performing Loan workflows; etc.), real estate mortgage origination, real estate valuations (e.g., use typicality metric as an input to an automated valuation model—as a warning, trigger, induce a workflow change, etc.; use method to identify 'comps'; use typicality metric as a supplement to a property-level valuation report; etc.), initial property assessment stage (e.g., for Single Family Rental workflows), appraisal review (e.g. use method to test validity of 'comps'), insurance loss (e.g., improving risk prediction for loss severity and/or incurring a loss by using a typicality metric calculated based on property attributes associated with that loss type), and/or otherwise used. In a specific example, the method can identify the properties that are low value outliers and are likely to be overvalued by an AVM.

In a specific example, the method can be used on a list of properties (e.g., to identify outliers in a portfolio). In a first example, inspectors, insurance agents, real estate agents, and/or any other human resources can be automatically allocated to the identified outliers. In a second example, computational resources (e.g., complex AVM models, more extensive attribute value analysis, etc.) can be automatically allocated to the identified outliers.

In variants, the typicality metric can be used as an input to an AVM model to reduce error in the model output (e.g., adjusting the model to account for atypicality, adjusting the model output to account for atypicality, etc.). The typicality metric can additionally or alternatively be used to determine whether to use another model (e.g., use a nonstandard AVM model for atypical properties) and/or adjust a model (e.g., adjust an AVM model for atypical properties). This can provide computational savings by identifying which homes need less or more computationally intensive models.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:
   determining images associated with a property;
   extracting a first set of attribute values from the images using a trained machine learning model;
   determining an uncertainty parameter for each of a subset of the first set of attribute values;
   determining a set of reference properties for the property;
   determining a second set of attribute values associated with the set of reference properties; and
   determining a typicality metric for the property based on:
      a comparison between the first and second sets of attribute values; and the uncertainty parameters.

2. The method of claim 1, further comprising determining an uncertainty parameter for each of a subset of the second set of attribute values, wherein the typicality metric is further determined based on a comparison between uncertainty parameters for the subset of the first set of attribute values and uncertainty parameters for the subset of the second set of attribute values.

3. The method of claim 1, wherein the first set of attribute values is a first vector of attribute values and the second set of attribute values is a second vector of attribute values, and wherein the comparison comprises a vector distance between the first and second vectors of attribute values.

4. The method of claim 3, wherein the vector distance is based on a variance associated with the second vector of attribute values.

5. The method of claim 4, wherein the vector distance is a Mahalanobis distance.

6. The method of claim 1, wherein determining the second set of attribute values comprises:
   for each reference property in the set of reference properties, determining an intermediate set of attribute values; and
   aggregating the intermediate sets of attribute values to generate the second set of attribute values.

7. The method of claim 6, wherein the comparison comprises a comparison between the first set of attribute values and a distribution of the aggregated intermediate sets of attribute values.

8. The method of claim 1, wherein the first set of attribute values further comprises record attribute values for the property.

9. A method, comprising:
   determining images associated with a property;
   extracting a first set of attribute values from the images;
   determining a set of reference properties for the property;
   determining a second set of attribute values associated with the set of reference properties, wherein the first and second sets of attribute values each comprise structural attribute values, wherein the first set of attribute values and the second set of attribute values are transformed into a learned embedding; and
   determining a typicality metric for the property based on a comparison between the transformed first set of attribute values and the transformed second set of attribute values.

10. A system, comprising:
    a database comprising property information for each of a set of properties, wherein the property information comprises remote imagery; and
    a processor configured to:
       extract a first set of property attribute values from the property information for a property in the set of properties;
       extract a set of property attribute values from the property information for each of a set of reference properties, wherein the reference properties are in the set of properties; and
       using a typicality model, determine a typicality metric for the property based on the first set of property attribute values and a distribution of the sets of property attribute values for the reference properties, wherein the typicality model predicts the typicality metric based on a distance in feature space between the first set of property attribute values and the sets of property attribute values for the reference properties.

11. The method of claim 10, wherein the typicality model predicts the typicality metric based on a variance associated with the distribution.

12. The method of claim 11, wherein the distribution is multimodal.

13. The method of claim 10, wherein the processor is further configured to determine an uncertainty parameter for each of a subset of the first set of property attribute values, wherein the typicality metric is further predicted based on the uncertainty parameters.

14. The method of claim 10, wherein the typicality model is trained to predict a metric for a training property, wherein the metric is determined based on automated valuation model error associated with the training property.

15. The method of claim 10, wherein the first set of property attribute values correspond to a set of attributes selected using an attribute selection model, wherein the attribute selection model is trained to select attributes correlated with automated valuation model error.

16. The method of claim 10, wherein a set of comparable properties is selected from the set of properties using the typicality metric.

* * * * *